(12) United States Patent
Black et al.

(10) Patent No.: US 12,469,181 B2
(45) Date of Patent: Nov. 11, 2025

(54) PROCEDURE INFORMATION SHARING AND PERFORMANCE USING MIXED AND AUGMENTED REALITY

(71) Applicant: DeGen Medical, Inc., Florence, SC (US)

(72) Inventors: Craig Black, Florence, SC (US); Charles Robert Lucasiewicz, Florence, SC (US); Craig Russell, League City, TX (US); Hitesh Mehta, Florence, SC (US); Marco Zambetti, League City, TX (US); Mike Prosser, Mount Pleasant, SC (US); Chris Duneske, Kirkwood, MO (US)

(73) Assignee: DeGen Medical, Inc., Florence, SC (US)

( * ) Notice: Subject to any disclaimer, the term of this patent is extended or adjusted under 35 U.S.C. 154(b) by 0 days.

(21) Appl. No.: 17/568,395

(22) Filed: Jan. 4, 2022

(65) Prior Publication Data

US 2022/0270300 A1 Aug. 25, 2022

Related U.S. Application Data

(60) Provisional application No. 63/209,612, filed on Jun. 11, 2021, provisional application No. 63/133,627, filed on Jan. 4, 2021.

(51) Int. Cl.
*G16H 30/20* (2018.01)
*A61B 90/00* (2016.01)
*G06F 3/14* (2006.01)
*G06T 11/00* (2006.01)

(52) U.S. Cl.
CPC ............ *G06T 11/00* (2013.01); *A61B 90/36* (2016.02); *G06F 3/1454* (2013.01); *A61B 2090/365* (2016.02); *G06T 2200/24* (2013.01); *G06T 2210/41* (2013.01)

(58) Field of Classification Search
CPC .............................. G06T 11/00; G06F 3/1454
USPC .......................................................... 345/633
See application file for complete search history.

(56) References Cited

U.S. PATENT DOCUMENTS

| | | | |
|---|---|---|---|
| 10,398,514 B2 | 9/2019 | Ryan et al. |
| 10,602,114 B2 | 3/2020 | Casas |
| 10,636,323 B2 | 4/2020 | Buras et al. |
| 10,646,285 B2 | 5/2020 | Siemionow et al. |
| 10,796,605 B2 | 10/2020 | Buras et al. |
| 10,818,199 B2 | 10/2020 | Buras et al. |

(Continued)

*Primary Examiner* — Samantha (Yuehan) Wang
(74) *Attorney, Agent, or Firm* — MacMillan, Sobanski & Todd, LLC

(57) ABSTRACT

The technical description relates to mixed reality, augmented reality, and their use in the sharing of information about a procedure and in the performing of a procedure. A method for sharing information about a procedure and performing the procedure includes using a mixed reality system in a first location to display a mixed reality image having a virtual element representing information related to the procedure, instructing an information recipient to use an augmented reality system to view the virtual element, interacting with the virtual element to create a transformed virtual element, and manipulating a physical element in a second location while performing the procedure. Specific examples described herein relate to the field of medicine, and to orthopedics in particular.

20 Claims, 10 Drawing Sheets

(56) References Cited

U.S. PATENT DOCUMENTS

| | | |
|---|---|---|
| 11,011,078 B2 | 5/2021 | Buras et al. |
| 11,017,694 B2 | 5/2021 | Buras et al. |
| 11,017,695 B2 | 5/2021 | Buras et al. |
| 11,553,969 B1 * | 1/2023 | Lang .................. G02B 27/0172 |
| 2018/0078316 A1 | 3/2018 | Schaewe et al. |
| 2018/0185100 A1 | 7/2018 | Weinstein et al. |
| 2018/0303558 A1 * | 10/2018 | Thomas ................. A61B 34/20 |
| 2019/0053851 A1 | 2/2019 | Siemionow et al. |
| 2019/0053855 A1 | 2/2019 | Siemionow et al. |
| 2019/0105009 A1 | 4/2019 | Siemionow et al. |
| 2019/0142519 A1 | 5/2019 | Siemionow et al. |
| 2019/0175285 A1 | 6/2019 | Siemionow et al. |
| 2019/0192230 A1 | 6/2019 | Siemionow et al. |
| 2019/0201106 A1 | 7/2019 | Siemionow et al. |
| 2019/0209080 A1 | 7/2019 | Gullotti et al. |
| 2020/0051274 A1 | 2/2020 | Siemionow et al. |
| 2020/0151507 A1 | 5/2020 | Siemionow et al. |
| 2020/0152088 A1 | 5/2020 | Buras et al. |
| 2020/0229877 A1 | 7/2020 | Siemionow et al. |
| 2020/0265745 A1 | 8/2020 | Buras et al. |
| 2020/0265754 A1 | 8/2020 | Buras et al. |
| 2020/0268349 A1 | 8/2020 | Buras et al. |
| 2021/0016929 A1 | 1/2021 | Carmody |
| 2021/0104178 A1 | 4/2021 | Buras et al. |
| 2021/0166583 A1 | 6/2021 | Buras et al. |
| 2021/0295048 A1 | 9/2021 | Buras et al. |
| 2021/0312833 A1 * | 10/2021 | Betteridge ............. G16H 50/20 |
| 2021/0366312 A1 | 11/2021 | Buras et al. |
| 2022/0076819 A1 | 3/2022 | Danial et al. |
| 2022/0078167 A1 | 3/2022 | Danial et al. |

* cited by examiner

PROCEDURE INFORMATION SHARING AND PERFORMANCE USING MIXED AND AUGMENTED REALITY

RELATED APPLICATIONS

This application claim priority to U.S. Provisional Application No. 63/133,627, filed Jan. 4, 2021, and U.S. Provisional Application No. 63/209,612, filed Jun. 11, 2021. The entire contents of each of these related applications are hereby incorporated by reference into this disclosure.

FIELD

The disclosure relates generally to sharing information about a procedure and performing the procedure. More particularly, the disclosure relates to the allocation of mixed reality and augmented reality resources between an information sharer and an information recipient that are both involved in a procedure. The disclosure also relates to the use of mixed reality resources in the performance of a procedure. Systems, methods, apparatuses, and kits are described. Specific examples described herein relate to the field of medicine, and to orthopedics in particular. Other specific examples described herein relate to the field of construction.

BACKGROUND

The use of extended reality technology in the performance of technical procedures, such as medical procedures, specialized construction procedures, and other procedures, has become more prevalent in recent years. While the incorporation of extended reality technology into these procedures has allowed for more successful outcomes by enhancing the abilities of the individual or team of individuals performed the procedures, currently available systems, methods, apparatuses, and kits do not fully utilize the capabilities of the technology. Indeed, in some circumstances, use of extended reality technology creates a barrier for individuals associated with procedures, such as patients on which a medical procedure is to be performed, discouraging full adoption of the technology and leveraging of the technology to benefit everyone associated with a particular procedure.

A need exists, therefore, for new systems, methods, apparatuses, and kits useful for sharing information about a procedure, performing a procedure, or both. Various systems, methods, apparatuses, and kits that use extended reality technology are described herein to meet this need.

BRIEF SUMMARY OF SELECTED EXAMPLES

Various example systems useful for sharing information about a procedure are described.

An example system for sharing information about a procedure comprises a computing device, a mixed reality system in data communication with the computing device by a first communication link, and an augmented reality system in data communication with the computing device by a second communication link.

Another example system for sharing information about a procedure comprises a computing device, a mixed reality system comprising a first head mounted viewing device in data communication with the computing device by a first communication link, an augmented reality system comprising a second head mounted viewing device in data communication with the computing device by a second communication link, and at least one additional display in data communication with the computing device by a third communication link.

Another example system for sharing information about a procedure comprises a computing device, a mixed reality system comprising a mixed reality head mounted viewing device in data communication with the computing device by a mixed reality communication link, at least one augmented reality system, each of the at least one augmented reality system comprising an augmented reality head mounted viewing device in data communication with the computing device by an augmented reality communication link, and at least one additional display in data communication with the computing device by an additional display communication link.

Various example systems useful for performing a procedure are described.

An example system for performing a procedure comprises an optical tracking device, a workpiece registration member, a tool useable by a performer of the procedure in the performance of the procedure, and a mixed reality system. The workpiece registration member includes a first frame including a first plurality of registration markers trackable by the optical tracking device. The tool includes a second frame including a second plurality of registration markers trackable by the optical tracking device. The mixed reality system includes a third frame including a third plurality of registration markers trackable by the optical tracking device.

Another example system for performing a procedure comprises an optical tracking device, a workpiece registration member, a tool useable by a performer of the procedure in the performance of the procedure, and a mixed reality system. The workpiece registration member includes a first frame including a first plurality of registration markers trackable by the optical tracking device. The tool includes a second frame including a second plurality of registration markers trackable by the optical tracking device. The mixed reality system includes a third frame including a third plurality of registration markers trackable by the optical tracking device. The third frame includes a base portion and an extension having an arm extending away from the base portion. The registration markers of the third plurality of registration markers are disposed along the length of the arm. The arm and each registration marker of the third plurality of registration markers lies on a plane that includes the lengthwise axis of the mixed reality system and that is orthogonal to, or substantially orthogonal to, a plane that includes the lateral axis of the mixed reality system.

Another example system for performing a procedure comprises an optical tracking device, a workpiece registration member, a tool useable by a performer of the procedure in the performance of the procedure, and a mixed reality system. The workpiece registration member includes a first frame including a first plurality of registration markers trackable by the optical tracking device. The tool includes a second frame including a second plurality of registration markers trackable by the optical tracking device. The mixed reality system includes a third frame including a third plurality of registration markers trackable by the optical tracking device. The third frame includes a base portion and an extension having multiple arms, each of which extends away from the base portion along a curvilinear path. A registration marker of the third plurality of registration markers is disposed at the end of each arm of the multiple arms. Each arm of the multiple arms and each registration marker of the third plurality of registration markers lies on a plane that includes the lengthwise axis of the mixed reality system and that is orthogonal to, or substantially orthogonal to, a plane that includes the lateral axis of the mixed reality system.

Various example systems useful for sharing information about a procedure and for performing the procedure are described.

An example system for sharing information about a procedure and for performing the procedure comprises a computing device, a mixed reality system in data communication with the computing device by a first communication link, an augmented reality system in data communication with the computing device by a second communication link, an optical tracking device in data communication with the computing device by a third communication link, a workpiece registration member, and a tool useful in the performance of the procedure. The workpiece registration member includes a first frame with multiple arms extending outwardly in a first pattern. A registration marker is attached to each arm. The tool includes a second frame with multiple arms extending outwardly in a second pattern that is different from the first pattern. A registration marker is attached to each arm. The mixed reality system includes a third frame attached to the mixed reality viewing device, with multiple arms extending outwardly in a third pattern that is different from the first and second patterns. A registration marker is attached to each arm of the third frame.

Various methods for sharing information about a procedure are described.

An example method for sharing information about a procedure comprises using a mixed reality system to display a mixed reality image comprising a live view of a first real world environment and a virtual element not present in the first real world environment, the virtual element comprising a representation of information related to the procedure; instructing an information recipient to use an augmented reality system in data communication with the mixed reality system to view an augmented reality image comprising a live view of a second real world environment and the virtual element; and interacting with the virtual element to create a transformed virtual element and cause the mixed reality system to replace the virtual element in the mixed reality image and the augmented reality image with the transformed virtual element.

Various methods for sharing information about a procedure and performing the procedure are described.

An example method for sharing information about a procedure and performing the procedure comprises using a mixed reality system to display a mixed reality image comprising a live view of a first real world environment and a virtual element not present in the first real world environment, the virtual element comprising a representation of information related to the procedure; instructing an information recipient to use an augmented reality system in data communication with the mixed reality system to view an augmented reality image comprising a live view of a second real world environment and the virtual element; interacting with the virtual element to create a transformed virtual element and cause the mixed reality system to replace the virtual element in the mixed reality image and the augmented reality image with the transformed virtual element; and manipulating a physical element in a third real world environment while performing the procedure.

Various methods for performing a procedure are described.

An example method for performing a procedure comprises using a mixed reality system to display a mixed reality image comprising a live view of a first real world environment and a virtual element comprising a representation of a physical item present in the first real world environment, instructing an information recipient to use an augmented reality system in data communication with the mixed reality system to view an augmented reality image comprising a live view of a second real world environment and the virtual element, manipulating the physical item such that the mixed reality system moves the virtual element in the virtual reality image and the mixed reality image, and sharing information with the information recipient while manipulating the physical item.

Another example method for performing a procedure comprises obtaining an image of a bone or bones of a patient, such as a vertebral body, a regional portion of a spine, or the entire spine of a patient, providing spatial coordinates, such as a point cloud, representing the imaged bone or bones of the patient to a mixed reality viewing device, generating a virtual element representing the image of the bone or bones, displaying the virtual element on a display screen of the mixed reality viewing device, displaying the virtual element on an external display screen separate from the display screen of the mixed reality viewing device, such as a monitor. The displaying the virtual element on a display screen of the mixed reality viewing device occurs in a room that is different from the room in which the displaying the virtual element on an external display screen separate from the display screen of the mixed reality viewing device occurs.

Another example method for performing a procedure comprises obtaining an image of a bone or bones of a patient, such as a vertebral body, a regional portion of a spine, or the entire spine of a patient, providing spatial coordinates, such as a point cloud, representing the imaged bone or bones of the patient to a mixed reality viewing device, generating a virtual element representing the image of the bone or bones, displaying the virtual element on a display screen of the mixed reality viewing device, and displaying the virtual element on a display screen of a second mixed reality viewing device, a display screen of an augmented reality viewing device of an augmented reality system, or both concurrently in different rooms, concurrently in the same room, prior to a medical procedure on the bone represented by the virtual element, and/or concurrently with a medical procedure on the bone represented by the virtual element.

Various apparatuses useful in procedures aided by mixed reality are described.

An example apparatus useful in procedures aided by mixed reality comprises a frame having a base portion and an extension having an arm extending away from the base portion. A plurality of registration markers is disposed along the length of the arm. Each registration marker of the plurality of registration markers comprises a body and a connector extending between and connecting the body and the arm. The arm and each registration marker of the plurality of registration markers lies on a plane that includes the lengthwise axis of the frame and that is orthogonal to, or substantially orthogonal to, a plane that includes the lateral axis of the frame.

Another example apparatus useful in procedures aided by mixed reality comprises a frame having a base portion and an extension having an arm extending away from the base portion along a curvilinear path. A plurality of registration markers is disposed along the length of the arm. Each registration marker of the plurality of registration markers comprises a body and a connector extending between and connecting the body and the arm. The arm and each registration marker of the plurality of registration markers lies on a plane that includes the lengthwise axis of the frame and that is orthogonal to, or substantially orthogonal to, a plane that includes the lateral axis of the frame.

Another example apparatus useful in procedures aided by mixed reality comprises a frame having a base portion and an extension having multiple arms, each of which extends away from the base portion along a curvilinear path, and a plurality of registration markers. A registration marker of a plurality of registration markers is disposed at the end of each arm of the multiple arms. Each arm of the multiple arms and each registration marker of the plurality of registration markers lies on a plane that includes the lengthwise axis of the frame and that is orthogonal to, or substantially orthogonal to, a plane that includes the lateral axis of the frame.

Various kits are described.

An example kit for sharing information about a procedure comprises a computing device, a mixed reality system adapted to be placed in data communication with the computing device by a first communication link, and an augmented reality system adapted to be placed in data communication with the computing device by a second communication link. Each of the computing device, mixed reality system, and augmented reality system is disposed within a container.

Additional understanding of the inventive systems, methods, apparatuses, and kits can be obtained with review of the detailed description of selected examples, below, with reference to the appended drawings.

DESCRIPTION OF SELECTED EXAMPLES

Figure 1C:
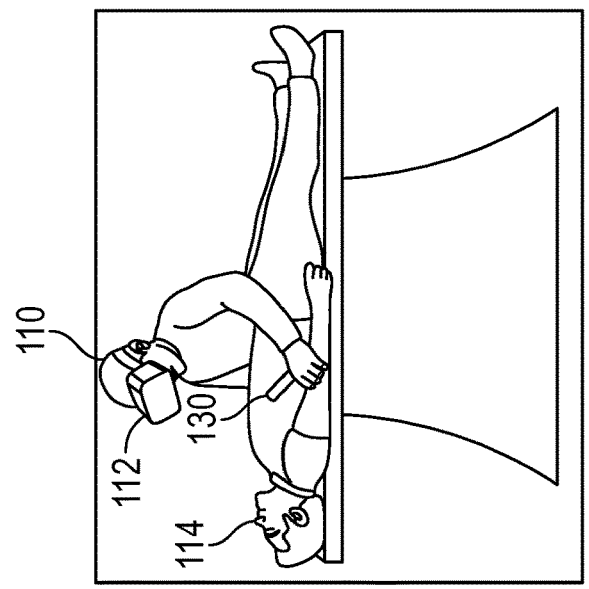
FIG. 1C is a schematic representation of another stage of the use of an example system for sharing information about a procedure and performing the procedure.

The following detailed description and the appended drawings describe and illustrate various example systems, methods, apparatuses, and kits. The description and illustration of each of these specific examples are provided to enable one skilled in the art to make and use an example system, apparatus, or kit, or to perform an example method, in accordance with the invention. They are not intended to limit the scope of the claims in any manner.

As used herein, the term "augmented reality," and grammatically related terms, refers to the combination of a real image with one or more non-interactive virtual images to create an augmented reality image. The term applies to the creation, projection, viewing, and other actions relating to augmented reality images. An augmented reality image includes a direct or indirect live view of a physical, real-world environment (the real image component) augmented with virtual element(s) that are not present in the physical, real-world environment depicted in the view, augmentation(s) of element(s) that are present in the physical, real-world environment depicted in the view, or both (the virtual image component). An augmented reality image can include multiple sensory modalities, including visual, auditory, and haptic modalities. As used herein, the term "augmented reality" excludes provision to a user of an ability to interact with the virtual image component present in an augmented reality image. Thus, an augmented reality system, as the term is used herein, is a computing device that can display an augmented reality image having a real image component and a virtual image component, but that does not provide a user of the augmented reality system an ability to interact with the virtual image component. In this sense, an augmented reality system, as used herein, is a passive extended reality system. Contrast this with a mixed reality system, which, as described below, is an active extended reality system that provides interactivity to the user.

As used herein, the term "computing device," and grammatically related terms, refers to an electronic device for storing, temporarily, permanently, or both, and processing data according to instructions contained in software provided to the device. Examples of computing devices include, without limitation, microcomputers, minicomputers, servers, mainframes, laptops, personal data assistants (PDA), smartphones, and other programmable devices configured to transmit and/or receive data over a network. Computing devices can include internal memory, external memory, or both for storing software, data, or both used in obtaining, processing, and communicating information. Computing devices can include one or more processors in communication with memory via one or more data buses that carry electrical signals between processor(s) and memory.

As used herein, the term "information sharer," and grammatically related terms, refers to an individual human being who possesses information about a procedure that is not possessed by an information recipient in the procedure.

As used herein, the term "extended reality," and grammatically related terms, refers to a category of technology that includes augmented reality, mixed reality, and virtual reality.

As used herein, the term "in data communication with," and grammatically related terms, refers to the existence of a communication link between the referenced items by which at least one item can transmit computer data to the other item. The term encompasses by one-way and two-way communication links, and communication links between hardware items, communication links between software items (for example, an application and a data store, such as a file or a database), and communication links between hardware items and software items.

As used herein, the term "information," and grammatically related terms, refers to facts, opinions, or both relating to a referenced person, object, procedure, or other item. As used herein in reference to a procedure, the term includes facts relating to the general manner in which the referenced procedure is performed, facts relating to an identifiable future performance of the referenced procedure, facts relating to an identifiable past performance of the referenced procedure, opinions relating to an identifiable future performance of the referenced procedure, and opinions relating to an identifiable past performance of a the referenced procedure.

As used herein, the term "information recipient," and grammatically related terms, refers to an individual human being who is willing to receive information about a procedure from an information sharer in the procedure.

As used herein, the term "mixed reality," and grammatically related terms, refers to the combination of a real image with one or more interactive virtual images to create a mixed reality image. The term applies to the creation, projection, viewing, and other actions relating to mixed reality images. A mixed reality image includes a direct or indirect live view of a physical, real-world environment (the real image component) augmented with virtual element(s) that are not present in the physical, real-world environment depicted in the view, augmentation(s) of element(s) that are present in the physical, real-world environment depicted in the view, or both (the virtual image component). A mixed reality image can include multiple sensory modalities, including visual, auditory, and haptic modalities. As used herein, the term "mixed reality" requires provision to a user of an ability to interact with the virtual image component present in a mixed reality image. Thus, a mixed reality system, as the term is used herein, is a computing device that can display a mixed reality image having a real image component and a virtual image component, and that provides a user of the mixed reality system an ability to interact with the virtual image component. In this sense, a mixed reality system, as used herein, is an active extended reality system. Contrast this with an augmented reality system, which, as described above, is a passive extended reality system that does not provide interactivity to the user.

As used herein, the term "possess information," and grammatically related terms, refers to the attribute of an individual human being having information or access to information and having an ability to describe the information to another human being.

As used herein, the term "procedure," and grammatically related terms, refers to a series of actions conducted in a certain order or manner to achieve a desired result. For example, a medical procedure can include actions relating to removing a portion of the body of a patient, such as an intervertebral disc, and implanting an artificial member, such as an intervertebral spacer, in a resulting space within the body of a patient, among other actions.

As used herein, the term "room," and grammatically related terms, refers to a part or division of a building enclosed by walls, floor, and ceiling.

At least some of the examples described herein relate to computer-based systems, methods, or both. Skilled artisans will appreciate that at least some aspects of at least some of the examples described herein can be implemented using a variety of different software, firmware, and/or hardware elements. Software and/or firmware can be executed by a computing device having a central processor, or any other suitable computing device. Software code that can be used to implement examples described herein is not considered limiting. For example, examples described herein can be implemented by one or software programs, apps, modules, or other functional unit or combination of functions units using any suitable programming or other computer control language using, for example, conventional or object-oriented techniques. Such software can be stored on any type of suitable computer-readable medium or media, including, without limitation, system (nonvolatile) memory, an optical disk, magnetic tape, magnetic disk, diskettes, compact discs (CDs), digital versatile discs (DVDs), optical disk drives, hard disk drives, and solid state drives. The examples are described without specific reference to specific software code or specialized hardware components because artisans of ordinary skill would be able to design software and/or control hardware to implement the examples described herein with no more than reasonable effort and without undue experimentation.

Aspects of the invention relate to systems, apparatuses, and kits that support the use of augmented reality and mixed reality in the sharing of information about a procedure, performing the procedure, or both.

Figure 1B:
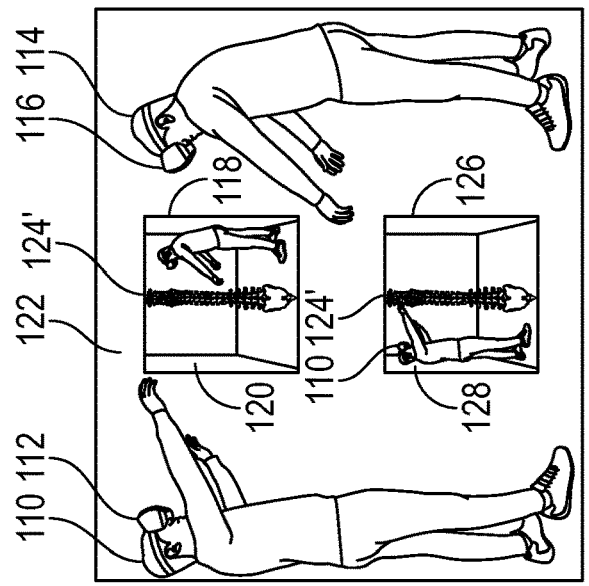
FIG. 1B is a schematic representation of another stage of the use of an example system for sharing information about a procedure and performing the procedure.
Figure 1A:
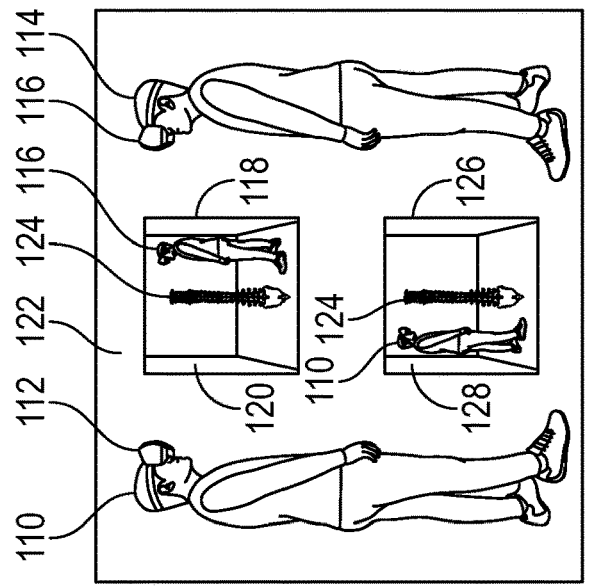
FIG. 1A is a schematic representation of a stage of the use of an example system for sharing information about a procedure and performing the procedure.

Each of FIGS. 1A, 1B, and 1C is a schematic representation of a stage of the use of an example system for sharing information about a procedure and performing the procedure. As such, FIGS. 1A, 1B, and 1C together provide a schematic overview of example methods and systems for sharing information about a procedure and performing the procedure. Each of FIGS. 1A and 1B illustrate use of components of the system in the sharing of information about a procedure, while FIG. 1C illustrates use of components of the system in the performance of the procedure.

In FIG. 1A, an information sharer 110, a medical practitioner in this example, is using a mixed reality system 112 to share information about a medical procedure with an information recipient 114, a patient in this example, who is using an augmented reality system 116 that is in data communication with the mixed reality system 112 to receive the information shared by the information sharer 110. The information sharer 110 is using the mixed reality system 112 to display a mixed reality image 118 that includes a live view 120 of a real world environment 122, a patient visitation room in this example, and a virtual element 124, a virtual representation of a generalized human spine in this example, that is not present in the real world environment 122. The information sharer 110 has instructed the information recipient 114 to use the augmented reality system 116 to view an augmented reality image 126 that includes a live view 128 of the real world environment 122 and the virtual element 124.

In FIG. 1B, the information sharer 110 is interacting with the virtual element 124 using the mixed reality system 112 to create a transformed virtual element 124'. In this example, the information sharer 110 has used his hands to pinch control corners of the virtual element 124 in the mixed reality image 118 and stretched the virtual element 124 to enlarge the virtual element 124. Thus, in this example, the transformed virtual element 124' is an enlarged version of the virtual element 124. The mixed reality system 112 has updated each of the mixed reality image 118 and the augmented reality image 126 to replace the virtual element 124 with the transformed virtual element 124'. As best illustrated in FIG. 1B, the information sharer 110 and the information recipient 114, medical practitioner and patient in this example, are now viewing a larger than life virtual representation of a generic human spine, allowing the medical practitioner to reference relevant portions of the spine in relation to a medical procedure the medical practitioner will perform, or has performed, on the patient.

In FIG. 1C, the information sharer 110 is performing a medical procedure on the information recipient 114. As part of the medical procedure, the information sharer 110 is manipulating a physical element 130, a driver in this example, to perform the medical procedure on the information recipient 114. In this example, the information sharer 110 is using a mixed reality system, which can be the same or a different mixed reality system from the mixed reality system used in the information sharing phases illustrated in FIGS. 1A and 1B.

The inventive systems are useful for sharing information about a procedure, performing the procedure, or both. All inventive systems include a computing device, at least one mixed reality system in data communication with the computing device, and optionally include at least one augmented reality system in data communication with the computing device, and other optional components.

Figure 2:
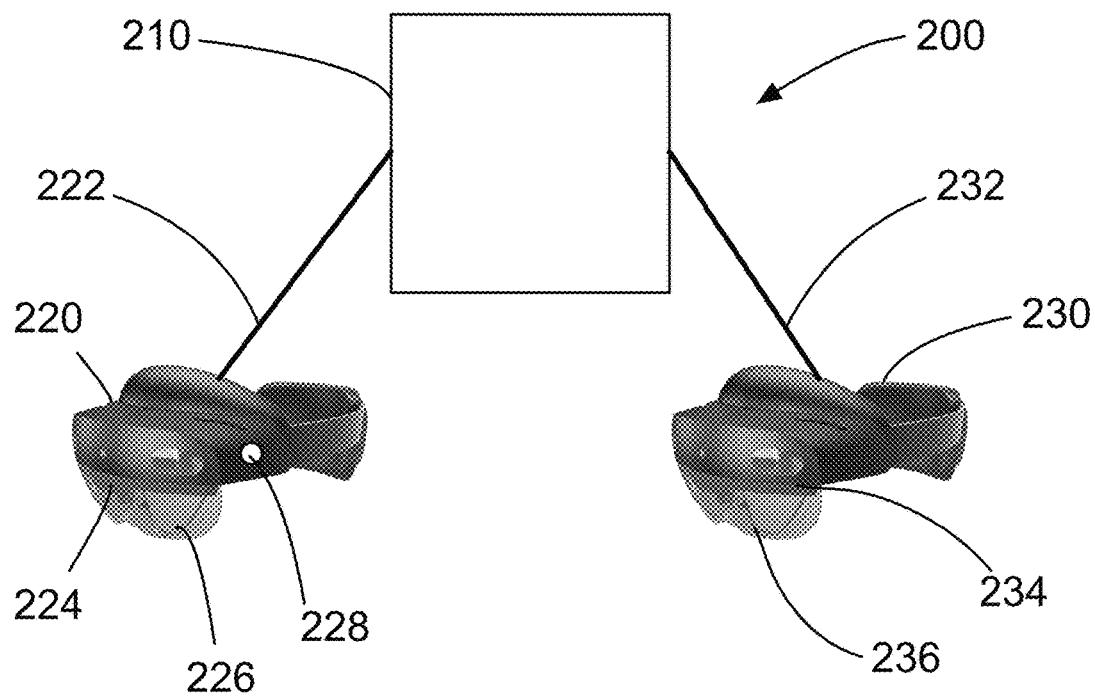
FIG. 2 is a schematic representation of an example system for sharing information about a procedure.

FIG. 2 illustrates an example system 200 useful for sharing information about a procedure. The system 200 comprises a computing device 210, a mixed reality system 220 and an augmented reality system 230. The mixed reality system 220 is in data communication with the computing device 210 by first communication link 222. The augmented reality system 230 is in data communication with the computing device 210 by second communication link 232.

The computing device 210 can be any suitable computing device that can be placed in data communication with the mixed reality system 220 and the augmented reality system 230, and advantageously can also be placed in data communication with one or more additional computing devise over a computer network, such as the internet, via wired or wireless connections. Examples of suitable computing devices include, but are not limited to, a desktop computer, a laptop computer, a tablet computer, and a smartphone. In one particular example, the computing device 210 is a laptop computer running a version of the Windows® operating system, such as Windows 10® software. It is noted that, each of the mixed reality 220 and augmented reality 220 systems is a computing device and can be used as the computing device 210 in the system. This is not currently considered advantageous, though, as the inclusion of a separate computing device in the system enables offloading of command and control aspects of the system 200, reserving computing resources in the mixed reality system 220 and the augmented reality system 220 for computing tasks more closely associated with the relevant system, such as sensing information in the environment and displaying appropriate extended reality images on the relevant viewing device.

Each of the mixed reality system 220 and the augmented reality system 220 includes a viewing device having one or more displays on which one or more extended reality images can be displayed to a wearer of the relevant device. Thus, the mixed reality system 220 includes a mixed reality viewing device 224 having one or more displays 226 on which one or more mixed reality images can be displayed to a wearer of the mixed reality viewing device 224, such as an information sharer, and the augmented reality system 230 includes a viewing device 234 having one or more displays 236 on which one or more augmented reality images can be displayed to a wearer of the augmented reality viewing device 234, such as an information recipient.

Each of the viewing devices 224, 234 can be a head mounted device, such as glasses, a visor with one or more flip-down displays, or the like. Each of the mixed reality system and the augmented reality system also includes a camera, a computing device, a power supply, computer memory, including random access memory and/or hard drive or other memory, an operating system, and wireless and/or direct physical connectivity for placing the system in data communication with other devices. It is noted that one or both of the mixed reality system and the augmented reality system used in a system according to an embodiment may have fewer or additional features and or components. For example, more than one camera may be included in a mixed reality system used in a system according to an embodiment. Indeed, the HoloLens 2 from Microsoft Corporation of Redmond, Washington, is considered a suitable mixed reality system for inclusion in embodiments of the invention, and includes multiple cameras.

Each of the mixed reality system 220 and the augmented reality system 230 can collect information from internal or external sensors and can support wireless technologies like Bluetooth, Wi-Fi, and GPS. The HoloLens® extended reality device, available from Microsoft Corporation (Redmond, WA), which includes a head mounted display, is considered a suitable viewing device for each of the mixed reality system 220 and the augmented reality system 230. The HoloLens device can include a head mounted, see-through holographic lenses (waveguides), 4 visible light cameras for head tracking, 2 IR cameras for head tracking, a depth sensor, an accelerometer, a gyroscope, a magnetometer, a camera capable of taking 8 megapixel still photographs and recording 1080p30 video, a microphone array, a multichannel speaker system, hand tracking, eye tracking, on-device command and control, network connectivity, including internet connectivity, Wi-Fi, Bluetooth, a system on a chip (SoC), memory and storage, accessory connections, such as USB-C connectors, an operating system, such as Windows Holographic Operating System, an internet browser, such as Microsoft Edge, a rechargeable battery, such as a lithium battery, active cooling components, passive cooling components, or both. The HoloLens device, through the use of a Holographic Processing Unit (HPU), can use sensual and natural interface commands—gaze, gesture, and voice—sometimes referred to as "GGV", inputs. Gaze commands, such as head-tracking, allows the user to bring application focus to whatever the user perceives.

It is noted that the mixed reality system 220 and the augmented reality system 230 can comprise identical pieces of hardware, with interactivity limited to the mixed reality system 220 by software. In the illustrated example, software, symbolized by element 228 in FIG. 2, on the mixed reality system 220 provides interactivity to a wearer of the viewing device 224, such as an information sharer. The software 228 can be a component of an operating system on the mixed reality system, an installed application on the mixed reality system, or other suitable software. The augmented reality system lacks such software, as symbolized by the absence of a corresponding element.

Each of the first communication link 222 and the second communication link 232 can be a wired communication link, such as an Ethernet connection, or a wireless link, for example a Bluetooth connection, and can transmit to the appropriate one of the mixed reality system 220 and the augmented reality system 230 control messages, data, variables, and other information, such as strings, integers and other numerical values, data files, such as image files, Boolean values, scripts, and the like from other components of the system 200, such as computing device 210. First communication link 222 can also transmit from the mixed reality system 220 to the computing device 210 mixed reality client (MRC) data, including JavaScript Object Notation (JSON) data and MRC status variables, such as strings, integers and other numerical values, data files, such as image files, Boolean values, scripts, and the like. The augmented reality system 230 does not provide a user of the augmented reality system 230 an ability to interact with the virtual elements included in augmented reality images displayed on the viewing device 234 of the augmented reality system 230. Accordingly, while the second communication link 232 can transmit from the augmented reality system 230 to the computing device 210 mixed reality client (MRC) data, it does not transmit data, commands, or other information relating to interactivity with virtual elements displayed in an augmented reality image.

A system useful for sharing information about a procedure according to a particular embodiment can include any suitable number of mixed reality systems and any suitable number of augmented reality systems, and a skilled artisan will be able to determine a suitable number of mixed reality systems and a suitable number of augmented reality systems to include in a system useful for sharing information about a procedure according to a particular embodiment based on various considerations, including an expected number of people with whom an information sharer will use the system to share information. It is considered advantageous to include only a single mixed reality system in a system useful for sharing information about a procedure to centralize interactivity in a single system, but additional mixed reality systems can be included as redundant systems, etc. Examples of suitable numbers of mixed reality systems and augmented reality systems for inclusion in a system useful for sharing information about a procedure include, but are not limited to, only one mixed reality system and only one augmented reality system, only one mixed reality system and one augmented reality system, only one mixed reality system and more than one augmented reality system, only one mixed reality system and two augmented reality systems, only one mixed reality system and three augmented reality systems, and only one mixed reality system and a plurality of augmented reality systems. A system useful for sharing information about a procedure that includes one mixed reality system and two augmented reality systems is considered particularly advantageous, particularly for the medical office example illustrated in FIGS. 1A, 1B, and 1C and described above, at least because it provides an ability to have a patient use one augmented reality system and a companion of the patient, such as a family member or other caretaker, use one augmented reality system, allowing the medical practitioner to effectively and efficiently share information with both individuals during a single consultation.

A system useful for sharing information about a procedure can include one or more additional displays for displaying information shared by the mixed reality system 230. Such additional displays, if included, can be a component of a computing device, such as a desktop personal computer, a laptop computer, a tablet computer, a smartphone, or the like that is in data communication with the mixed reality system 230. Alternatively, such additional displays can be a display that is in data communication with the mixed reality system 230 but that is not otherwise associated with a computing device. For example, a monitor, television, or other display panel can be included. The inventors have determined that a system useful for sharing information about a procedure that includes one mixed reality system, at least one augmented reality system, and at least one additional display is considered particularly advantageous, particularly for the medical office example illustrated in FIGS. 1A and 1B and described above, at least because it allows a patient to choose between using the augmented reality system and using the additional display when receiving information from the information sharer, while also providing an ability to have a patient and a companion of the patient receive information from the information sharer, providing the medical practitioner with an ability to accommodate a wide variety of patient preferences in use of the system.

Figure 3:
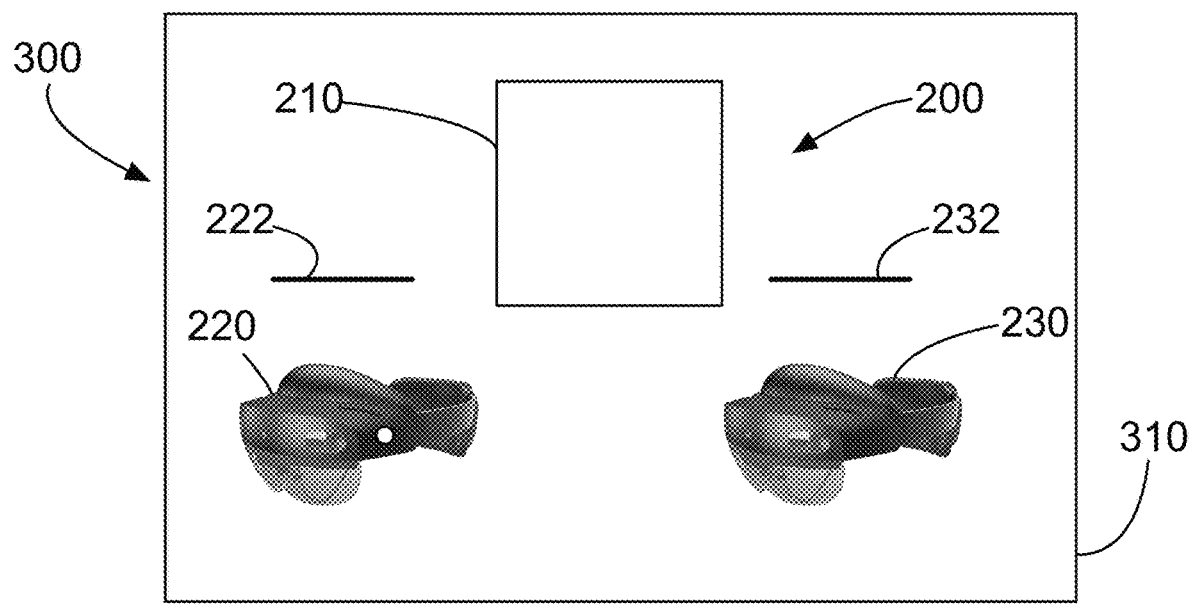
FIG. 3 is a schematic representation of an example kit for sharing information about a procedure.

FIG. 3 illustrates an example kit 300 useful for sharing information about a procedure. The kit includes the components of system 200 illustrated in FIG. 2 and described above, contained within a container 310. Accordingly, kit 300 includes computing device 210, mixed reality system 220, and augmented reality system 230. First 222 and second 232 communication links can be included in 300 if wired connections are used, but are not included as physical items when system 200 utilizes wireless connections for the communication links 222, 232. Also, while the figure illustrates a single container 310, it is noted that kit 300 can include more than one container, with at least one component of system 200 disposed within each container.

Aspects of the invention are useful in the performance of procedures independent of sharing of information about the procedure. Indeed, the invention provides systems, methods, kits, and apparatuses useful in the performance of procedures with or without a related sharing of information about the procedure.

Figure 4:
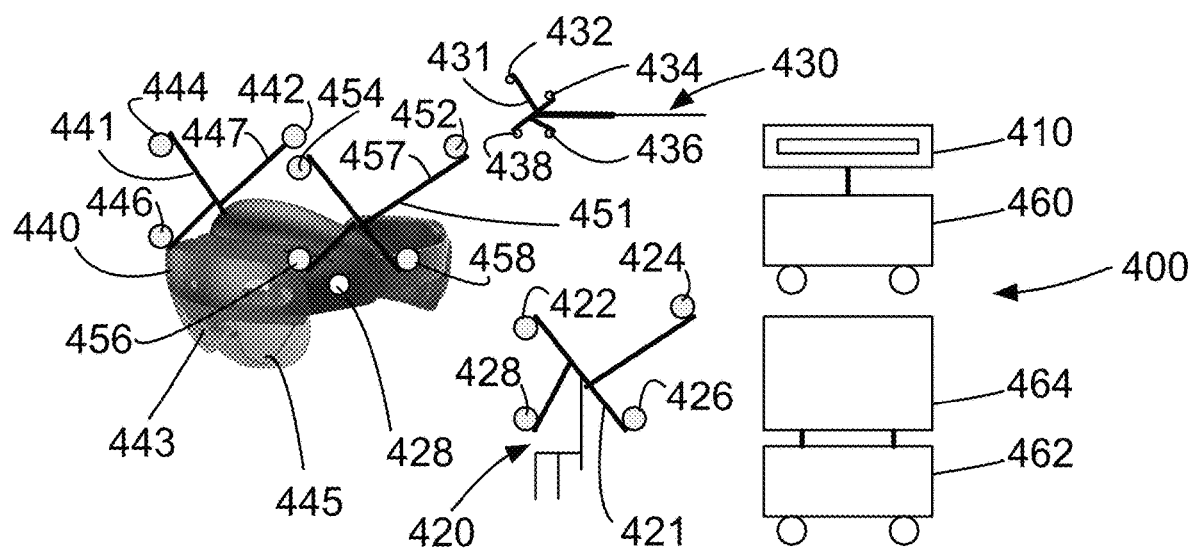
FIG. 4 is a schematic representation of an example system for performing a procedure.

FIG. 4 illustrates an example system 400 useful for performing a procedure, such as a medical procedure. The system 400 includes an optical tracking device 410, a workpiece registration member 420, a tool 430, and a mixed reality system 440. The workpiece registration member 420 includes a first frame 421 with multiple arms extending outwardly in a first pattern. A registration marker 422, 424, 426, 428 is attached to each arm. The tool 430 includes a second frame 431 with multiple arms extending outwardly in a second pattern that is different from the first pattern. A registration marker 432, 434, 436, 438 is attached to each arm. The mixed reality system 440 includes a third frame 441 attached to the mixed reality viewing device 443, with multiple arms extending outwardly in a third pattern that is different from the first and second patterns. A registration marker 442, 444, 446, 448 is attached to each arm of the third frame 441. In the illustrated embodiment, the mixed reality system 440 includes a fourth frame 451 attached to the mixed reality viewing device 443. The fourth frame 451 includes multiple arms extending outwardly in a fourth pattern that is different from the first, second, and third patterns. A registration marker 452, 454, 456, 458 is attached to each arm of the fourth frame 451. The system 400 can also include one or more carts 460, 462, and one or more external displays 464 in data communication with the mixed reality system 440.

The optical tracking device 410 emits and receives infrared light to identify and track x, y, z coordinates of each registration marker associated with the other components of the system 400, specifically, the workpiece registration member 420, the tool 430, and the mixed reality system 440. Any suitable optical tracking device can be used. The Polaris Vega series of optical tracking devices from NDI of Waterloo, Ontario, Canada are considered suitable.

The workpiece registration member 420 is adapted to be releasably secured to a workpiece that is involved in the procedure in which the system is used. As such, the workpiece registration member 420 can comprise any suitable structure for releasably attaching a member to a workpiece, such as a clamp have spring release, a threaded clamping member, or the like. The type, size, and configuration of the workpiece registration member in a system according to a particular embodiment will depend on various factors, including the nature of the workpiece to which the workpiece registration member is to be releasably secured. For systems useful in procedures that involves a bone of a patient, such as a vertebral body of a human spine, a clamp having a threaded clamping member is considered suitable. Also, while a clamp is illustrated, it is noted that any apparatus adapted to be releasably secured to a bone of a patient, or other suitable workpiece, and to include a frame with registration markers can be used. Example of alternative apparatuses include, but are not limited to, straps, screws, and the like.

The tool 430 can comprise any suitable hand tool adapted for use by the performer of the procedure for which the system is useful, during performance of the procedure. For example, the tool can be a hand tool useful to a medical practitioner in a medical procedure conducted on the bone to which the workpiece registration member 420 is secured. Examples of suitable hand tools include screwdrivers, ratcheted drivers, hammers, and other suitable hand tools.

The mixed reality system 440 is similar to the mixed reality system 220 described above and illustrated in FIG. 2. Thus, the mixed reality system 440 includes a mixed reality viewing device 443 having one or more displays 445 on which one or more mixed reality images can be displayed to a wearer of the mixed reality viewing device 443. The mixed reality system 440 also includes a camera, a computing device, a power supply, computer memory, including random access memory and/or hard drive or other memory, an operating system, and wireless and/or direct physical connectivity for operably connecting the mixed reality system to other devices, such as the optical tracking device 410. It is noted that the mixed reality system used in a system according to an embodiment may have fewer or additional features and or components. For example, more than one camera may be included in a mixed reality system used in a system according to an embodiment. Indeed, the HoloLens 2 from Microsoft Corporation of Redmond, Washington, is considered a suitable mixed reality system for inclusion in embodiments of the invention, and includes multiple cameras.

For the mixed reality system 400, the frames 441, 451 comprise relatively rigid material, such as a hard plastic material, as compared to other portions of the mixed reality system 440. Also, in the illustrated embodiment, the frames 441, 451 are fixedly attached to the mixed reality viewing device 443 in a manner that requires ordered disassembly using tools, such as a screwdriver or ratcheted driver, to remove the frames 441, 451 from the mixed reality viewing device 443. While the HoloLens 2 from Microsoft, Inc. of Redmond, WA is considered suitable for the mixed reality system 440, it does not include frames suitable for attaching registration markers, and those must be designed, made, and secured to any base headset, such as the HoloLens 2, used in a device, system, kit, or method according to an embodiment of the invention. The inclusion, structure, and properties of the frame or frames secured to the mixed reality system 440 are critical to the proper functioning of the inventive devices, systems, kits, and methods.

Also, in the illustrated embodiment, each of the frames 441, 451 include a long arm, 447, 457, each of which is the longest arm of the respective frame 441, 451 as measured from a central point at which all arms of the respective frame 441, 451 are joined. Each of the long arms 447, 457 extends away from and upward from the front of the mixed reality viewing device 443, placing the associated registration marker 442, 452 behind the forehead of a user and above the head of the user.

In use, the optical tracking device 410 tracks the x, y, z coordinates of each of the registration markers associated with each of the workpiece registration member 420, tool 430, and mixed reality system 440, and continuously transmits data representing all of the coordinates to the computer in the mixed reality system 440. The computer in the mixed reality headset processes the data and displays various images on the display screen 445 for a user to observe with their eyes. The images are overlaid on the reality the user sees in the field of view to create a mixed reality image. Using the coordinates from the optical tracking device 410, the computer can display a virtual representation of an item, such as a generated image comprising a wireframe or a solid fill image, over the actual item and can move that virtual representation as the actual item moves in the real scene, tracking the actual item and updating the virtual representation in real time or near real time. The computer can also use other data to generate images. For example, the computer advantageously has data stored on its memory that reflects imaging data of an actual body from the specific patient on which a procedure is being performed. For example, the computer can include CT image scan data, obtained from a CT image scan of the bone taken prior to the procedure, such as immediately before the procedure or during a prior healthcare appointment with the patient. Including this data is considered advantageous at least because it provides a data basis on which the computer can generate a virtual image of the patient-specific bone and display that image on the display screen 445 for the user to view over actual items in the real life scene when wearing the headset. For example, the computer can display the virtual image and, based on the data from the optical tracking device relating to the x, y, z coordinates of the registration markers of the clamp, attached to the bone or a bone or other patient body portion connected to the imaged bone, position the generated virtual image on top of the actual bone of the patient.

Inclusion of two frames on the mixed reality system 440 is considered advantageous at least because it facilitates tracking of the mixed reality viewing device 443 of the mixed reality system 440, via the attached registration markers, from both sides of the mixed reality viewing device 443, which can be important in certain situations. For example, if the optical tracking device 410 is positioned at the head or foot of a patient support surface in a procedure room, such as a surgical bed in an operating suite, inclusion of a frame on each side of the mixed reality viewing device 443 allows the optical tracking device 410 to track the mixed reality viewing device 443 regardless of which side of the patient support surface on which the wearer of the mixed reality viewing device 443 is positioned. Indeed, this arrangement even allows continuous tracking of the mixed reality viewing device 443 as the wearer of the mixed reality viewing device 443 moves from one side of the patient support surface to the other. This continuous and seamless tracking of the mixed reality viewing device 443 is considered important and even critical to the acceptance of the use of mixed reality in the performance of certain procedures during which any interruption in the display of a mixed reality image may be problematic, such as medical procedures. The structures described herein for frames for attachment to a mixed reality viewing device provide this desired performance characteristic.

The system 400 can include multiple mixed reality headsets, if desired. Additional headsets simply need frames attached that are different from the frame(s) attached to the first headset and those attached to the other components of the system (clamp, hand tool, etc.). Any suitable number of headsets can be included in a system according to an embodiment as long as this requirement is met.

Figure 5:
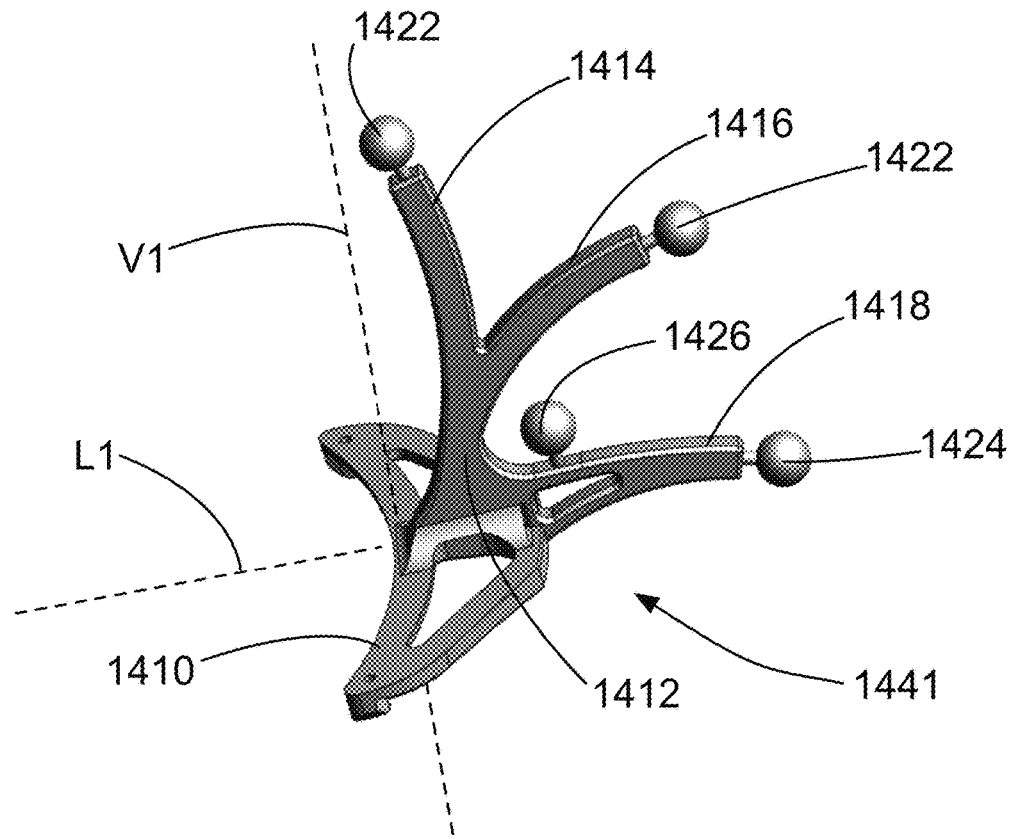
FIG. 5 is a perspective view of an example frame for inclusion in a mixed reality system.

FIG. 5 illustrates another example frame 1441 for inclusion in a mixed reality system according to an embodiment. In contrast to the dual frame structure of the mixed reality system 400 described above, frame 1441 is adapted to be attached to a mixed reality viewing device as the only frame bearing registration markers on the mixed reality viewing device. Frame 1441 includes a base portion 1410 and an extension 1412 that extends away from the base portion 1410. The extension 1412 includes first 1414, second 1416, and third 1418 arms, each of which generally extends away from the base portion 1410. A first registration marker 1420 is disposed at the end of the first arm 1414, a second registration marker 1422 is disposed at the end of the second arm 1416, and a third registration marker 1424 is disposed at the end of the third arm 1418. A fourth registration marker 1426 is disposed at the base of the third arm 1418. Each of the first 1414, second 1416, and third 1418 arms and each of the registration markers 1420, 1422, 1424, 1426 lies on a plane that includes the lengthwise axis L1 of the frame 1441 and that is orthogonal to, or substantially orthogonal to, a plane that includes the vertical axis V1 of the frame 1441. This structure is considered advantageous at least because it provides suitable positioning for the various registration markers with a single frame.

Figure 6:
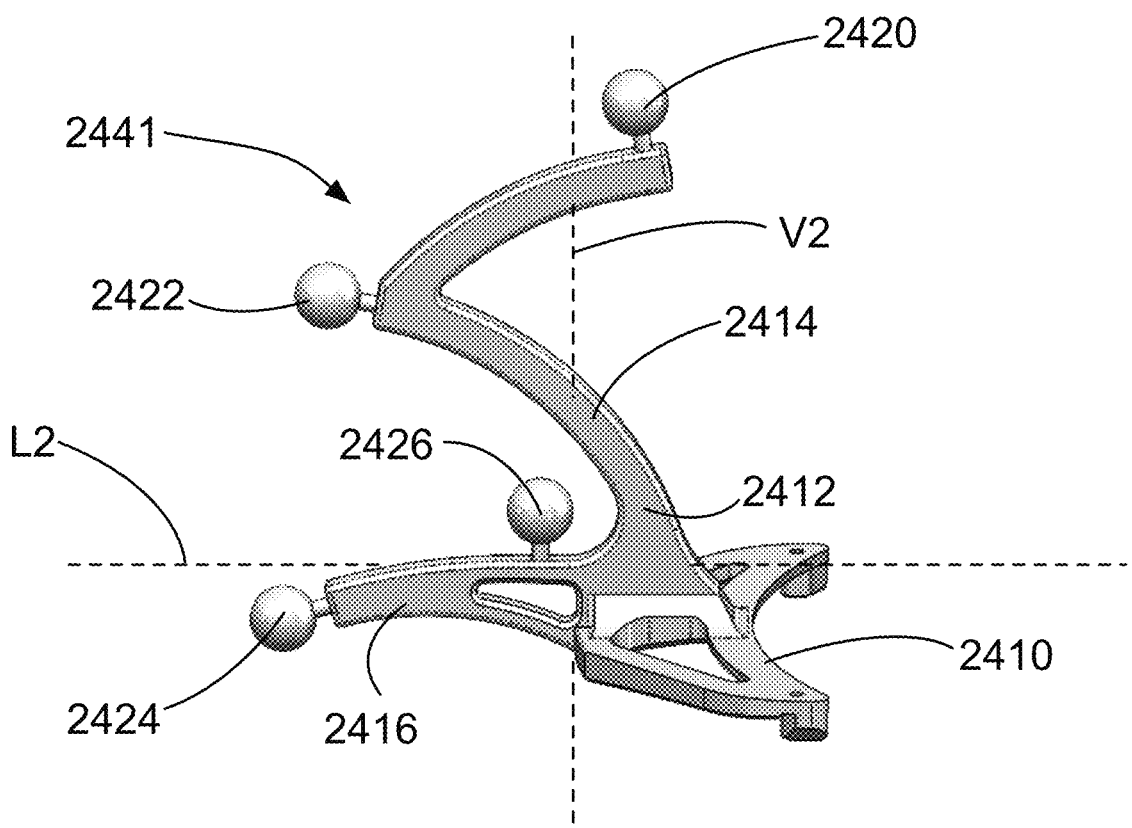
FIG. 6 is a perspective view of another example frame for inclusion in a mixed reality system.

FIG. 6 illustrates another example frame 2441 for inclusion in a mixed reality system according to an embodiment. Frame 2441 is adapted to be attached to a mixed reality viewing device as the only frame bearing registration markers on the mixed reality viewing device. The frame 2441 includes a base portion 2410 and an extension 2412 that extends away from the base portion 2410. The extension 2412 includes first 2414 and second 2416 arms, each of which generally extends away from the base portion 2410. In this example, first 2420 and second 2422 registration markers are disposed on the first arm 2414 while third 2424 and fourth 2426 registration markers are disposed on the second arm 2416. Each of the first 2414 and second 2416, arms and each of the registration markers 2420, 2422, 2424, 2426 lies on a plane that includes the lengthwise axis L2 of the frame 2441 and that is orthogonal to, or substantially orthogonal to, a plane that includes the vertical axis V2 of the frame 2441.

Figure 7:
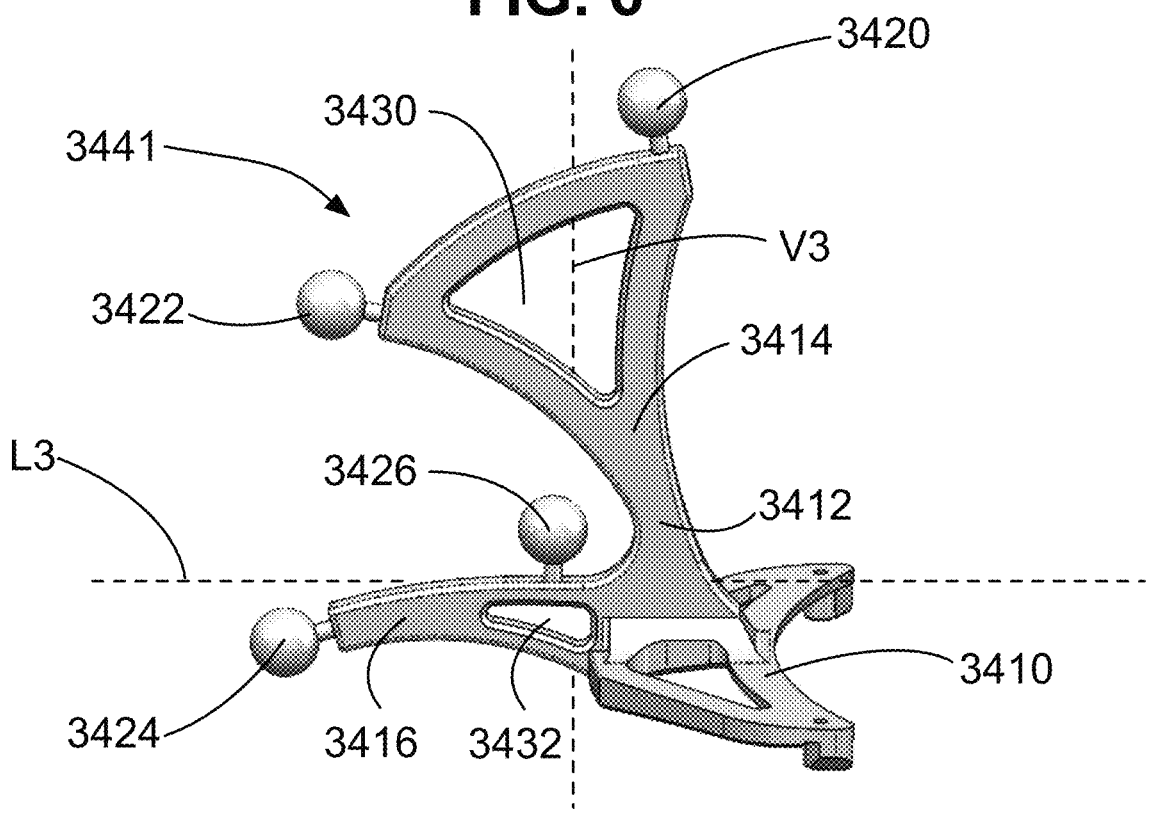
FIG. 7 is a perspective view of another example frame for inclusion in a mixed reality system.

FIG. 7 illustrates another example frame 3441 for inclusion in a mixed reality system according to an embodiment. Frame 3441 is adapted to be attached to a mixed reality viewing device as the only frame bearing registration markers on the mixed reality viewing device. The frame 3441 includes a base portion 3410 and an extension 3412 that extends away from the base portion 3410. The extension 3412 includes first 3414 and second 3416 arms, each of which generally extends away from the base portion 3410. In this example, first 3420 and second 3422 registration markers are disposed on the first arm 3414 while third 3424 and fourth 3426 registration markers are disposed on the second arm 3416. First arm 3414 defines first opening 3430 and second arm 3416 defines second opening 3432. Each of the first 3414 and second 3416, arms and each of the registration markers 3420, 3422, 3424, 3426 lies on a plane that includes the lengthwise axis L3 of the frame 3441 and that is orthogonal to, or substantially orthogonal to, a plane that includes the vertical axis V3 of the frame 3441.

Figure 8:
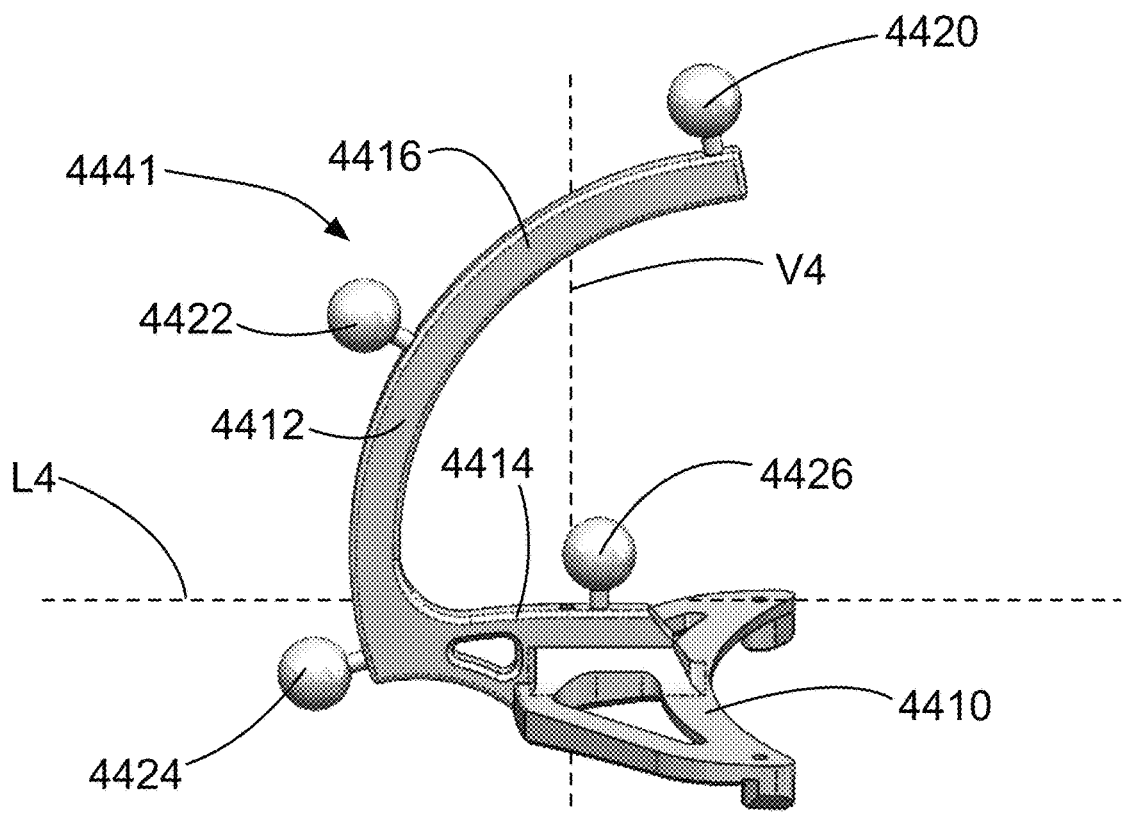
FIG. 8 is a perspective view of another example frame for inclusion in a mixed reality system.

FIG. 8 illustrates another example frame 4441 for inclusion in a mixed reality system according to an embodiment. Frame 4441 is adapted to be attached to a mixed reality viewing device as the only frame bearing registration markers on the mixed reality viewing device. The frame 4441 includes a base portion 4410 and an extension 4412 that extends away from the base portion 4410. The extension 4412 includes extension base 4414 and extension arm 4416. In this example, first 4420, second 4422, and third 4426 registration markers are disposed on the arm 4414 fourth 4426 registration marker is disposed on the extension base 4414. Extension arm 4414 defines a curvilinear path. Extension arm 4414 and each of the registration markers 4420, 4422, 4424, 4426 lies on a plane that includes the lengthwise axis L4 of the frame 4441 and that is orthogonal to, or substantially orthogonal to, a plane that includes the vertical axis V4 of the frame 4441.

Figure 9:
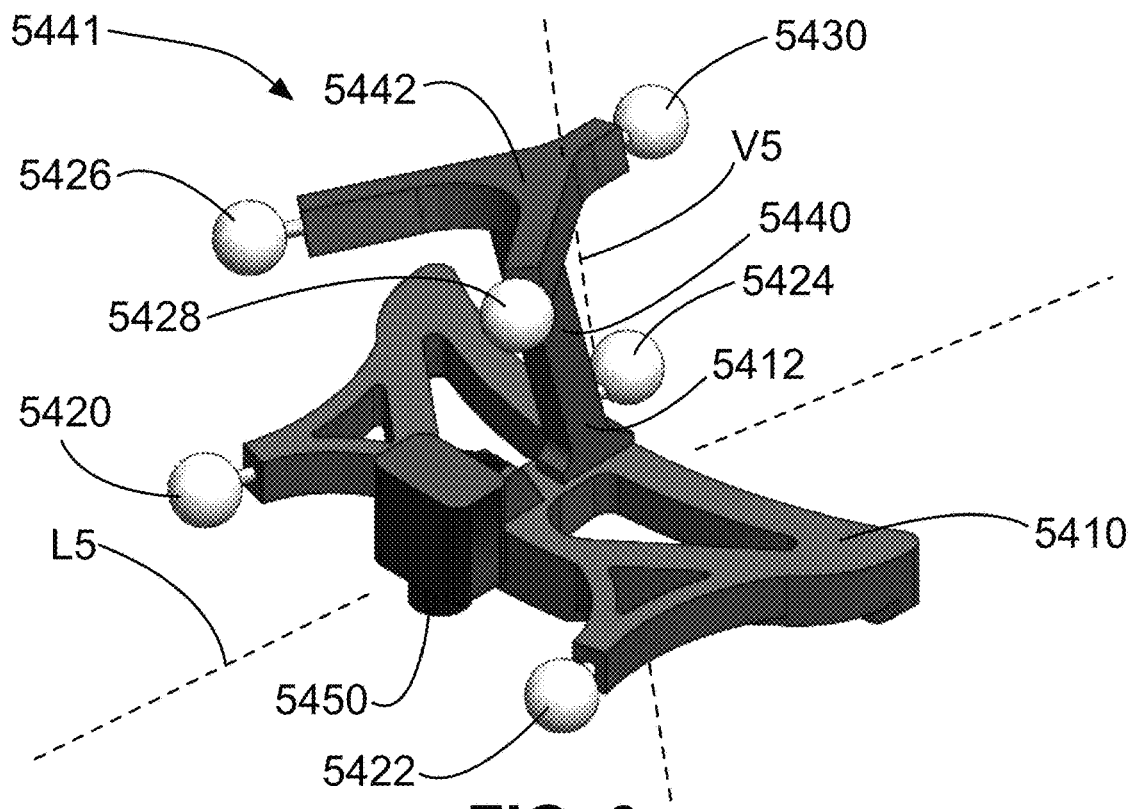
FIG. 9 is a perspective view of another example frame for inclusion in a mixed reality system.
Figure 10:
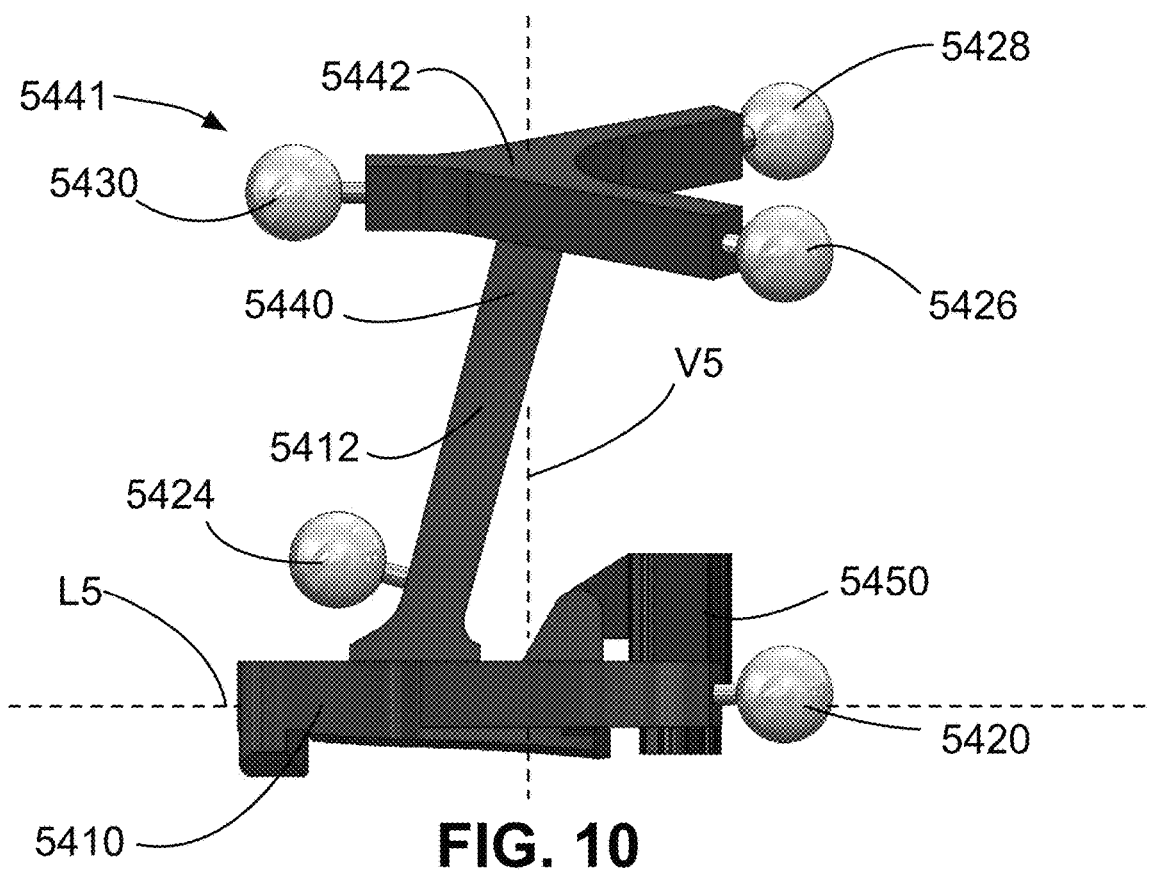
FIG. 10 is a side view of the example frame illustrated in FIG. 9.
Figure 11:
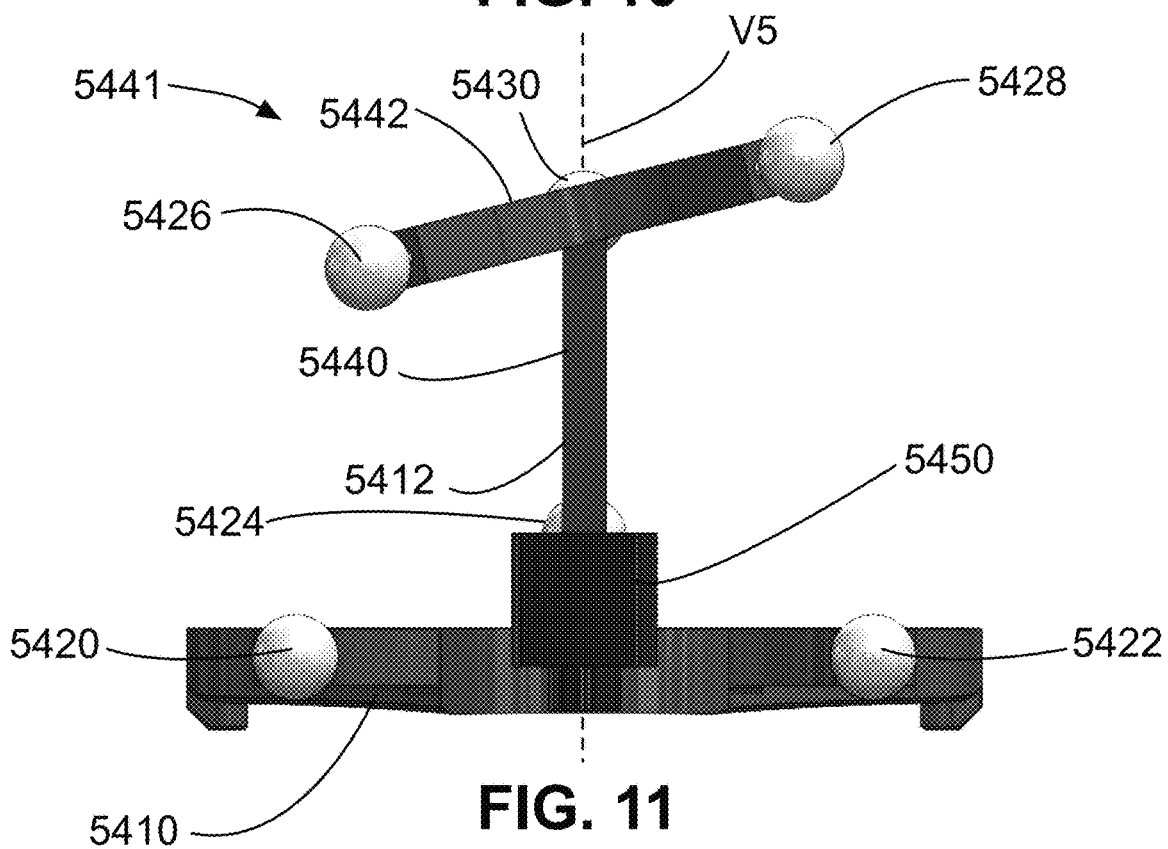
FIG. 11 is a front view of the example frame illustrated in FIG. 9.

FIGS. 9, 10, and 11 illustrate another example frame 5441 for inclusion in a mixed reality system according to an embodiment. Frame 5441 is adapted to be attached to a mixed reality viewing device as the only frame bearing registration markers on the mixed reality viewing device. Frame 5441 has lengthwise axis L5 and vertical axis V5. The frame 5441 includes a base portion 5410 and an extension 5412 that extends away from the base portion 5410. In this example, first 5420 and second 5422 registration markers are disposed on the base portion 5410. Third 5424, fourth 5426, fifth 5428, and sixth 5430 registration markers are disposed on the extension 5412. In this example, extension 5412 includes upright member 5440 that extends away from the base portion 5410 and Y-shaped member 5442. As best illustrated in FIGS. 10 and 11, Y-shaped member 5442 lies in a plane that is not parallel to a plane in which base portion 5410 lies. As best illustrated in FIG. 10, Y-shaped member 5442 is disposed at a non-parallel angle to the base portion 5410 to visually separate fourth 5426 and fifth 5428 registration markers when viewing the frame 5410 from the side. The third registration marker 5424 is disposed on the upright member 5440 while the fourth 5426, fifth 5428, and sixth 5430 registration markers are disposed on the Y-shaped member 5442. This structural arrangement of the base portion 5410, extension 5412, and registration markers 5420, 5422, 5424, 5426, 5428, 5430 is considered advantageous at least because it provides a spatial arrangement of the registration markers 5420, 5422, 5424, 5426, 5428, 5430 in which all viewing angles of the frame 5441, and a mixed reality viewing device to which it is attached, will include at least three of the registration markers 5420, 5422, 5424, 5426, 5428, 5430, and the distance between any two of all of the registration markers 5420, 5422, 5424, 5426, 5428, 5430 visible in the viewing angle is unique among all distances between pairs of the registration markers 5420, 5422, 5424, 5426, 5428, 5430 visible in that particular viewing angle.

Additional components can be attached to a frame to add functionality to the mixed reality viewing device. For example, in the example illustrated in FIGS. 9, 10, and 11, a light 5450 is attached to the base portion 5410. The light

5450 is pivotally attached to the base portion to allow adjustment of the angle at which the light 5450 directs light. Other examples of components that can be attached to a frame include a camera.

Single frame embodiments are considered advantageous at least because they provide a relatively simple structure for attachment to a mixed reality headset. Their use, however, creates additional challenges as the spatial arrangements of the registration markers is limited when compared to the options available in multi-frame embodiments. The structural configurations of the frames presented in the examples illustrated in FIGS. 5 through 11 are considered advantageous at least because they provide desirable arrangements of the associated registration markers while preserving the relatively simple structure of a single frame for attachment to a mixed reality headset. Advantageously, the structural arrangements of these frames allows continuous tracking when the wearer of the headset moves from one side of the bed to the other, similar to the multi-frame embodiments.

Each of the various components of the system is considered an individual device useful in medical procedures aided by mixed reality. The components of the system can also be packaged or otherwise grouped together to form a kit useful in medical procedures aided by mixed reality.

Aspects of the invention are useful in the sharing of information about a procedure along with performance of the procedure. Indeed, the invention provides systems, methods, kits, and apparatuses useful in the sharing of information about a procedure and the performance of the procedure.

Figure 12:
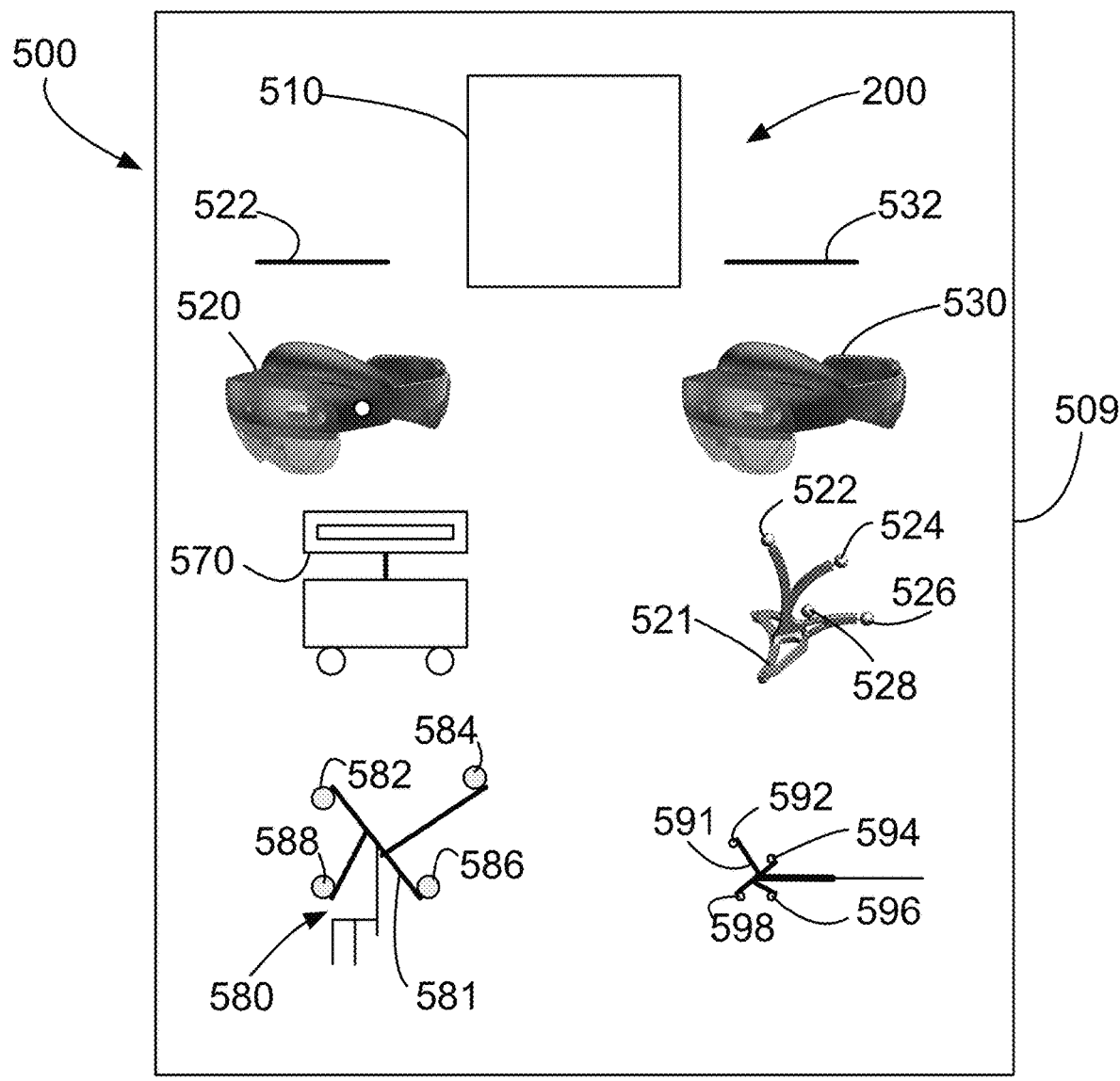
FIG. 12 is a schematic representation of an example system for sharing information about a procedure and for performing the procedure.

FIG. 12 illustrates an example system 500 for sharing information about a procedure and for performing the procedure. The system 500 includes components of a system for sharing information about a procedure, such as system 200, and components of a system for performing the procedure, such as system 400. Accordingly, system 500 includes a computing device 510, a mixed reality system 520 and an augmented reality system 530. The mixed reality system 520 is in data communication with the computing device 510 by first communication link 522. The augmented reality system 530 is in data communication with the computing device 510 by second communication link 532. System 500 also includes an optical tracking device 570, a workpiece registration member 580, and a tool 590. A first frame 481 with multiple arms extending outwardly in a first pattern can be releasably attached to the workpiece registration member 580. A registration marker 582, 584, 586, 588 is attached to each arm. A second frame 591 with multiple arms extending outwardly in a second pattern that is different from the first pattern can be releasably attached to the tool 590. A registration marker 592, 594, 596, 598 is attached to each arm. A third frame 521 can be releasably attached to the mixed reality viewing device 523, with multiple arms extending outwardly in a third pattern that is different from the first and second patterns. A registration marker 522, 524, 526, 528 is attached to each arm of the third frame 521.

The system 500 can include multiple mixed reality systems, which may be useful in certain applications of the system 500. For example, a medical practitioner can use one mixed reality system in an office environment, in which the medical practitioner uses the mixed reality system to share information about a procedure with an information recipient, and use another mixed reality system in a different location in which the medical practitioner performs the procedure. This eliminates the need to move mixed reality resources from one location to another, making both available for other, separate uses of the resources. Similarly, the system 500 can include multiple augmented reality systems, which may be useful in certain applications of the system 500. For example, multiple information recipients, such as students, can each individually and concurrently use an augmented reality system to receive information about a procedure before, during, or after an information sharer performs the procedure. Among other applications, this enables passive view of the live performance of a procedure by an information sharer, which is expected to be advantageous in a teaching environment.

The components of system 500 can be disposed within a container 509 to provide a kit. While the figure illustrates a single container 509, it is noted that a kit according to a particular embodiment can include more than one container, with at least one component of system 500 disposed within each container.

Aspects of the invention relate to the use of augmented reality and mixed reality in the sharing of information about a procedure between an information sharer and an information recipient. Example methods include using a mixed reality system to selectively share information about a procedure with an information recipient, and instructing the information recipient to use an augmented reality system to receive the information.

In example methods, an information sharer, who possesses information about a procedure in the form of general knowledge about the procedure, specific knowledge about the procedure, or both, uses mixed reality to selectively share information about the procedure to an information recipient, who lacks the information possessed by the information sharer. The information recipient uses augmented reality in their receiving of the information shared by the information sharer. In this sense, the information sharer may be an expert in the procedure, and the information recipient may be a non-expert in the procedure. This allocation of mixed reality resources to the information sharer and augmented reality resources to the information recipient enables a more focused and efficient transfer of knowledge about a procedure between information sharers and information recipients. This divided approach provides the information recipient with more confidence about the procedure while allowing the information sharer to reduce the amount of time required to share knowledge with the information recipient about the procedure. If the information sharer routinely performs the procedure, each instance of which involves sharing information about the procedure to an information recipient, the divided approach described herein may ultimately enable the information sharer to perform more procedures over a given timeframe.

In some example methods, an information sharer performs the procedure about which information is shared. In these examples, the information sharer who performs the procedure can be the same information sharer who shares information about the procedure with the information recipient. For example, a medical practitioner who is an information sharer in an orthopedic procedure, such as a discectomy, may share information with an individual who is an information recipient in the procedure, such as a patient of the medical practitioner, and also perform the procedure on the patient or another individual. Alternatively, the information sharer who performs the procedure can be a different information sharer from the information sharer who shares information about the procedure with the information recipient. For example, a first medical practitioner who is an information sharer in an orthopedic procedure, such as a spinal fusion procedure, may share information with an individual who is an information recipient in the procedure, such as a patient of a second medical practitioner, while the second medical practitioner, who is also an information sharer in the procedure, actually performs the procedure on the patient or another individual.

In other example methods, an information recipient performs the procedure about which information is shared. In these examples, the information recipient who performs the procedure can be the same information recipient with whom the information sharer shares information about the procedure. For example, a structural engineer who is an information sharer in reinforcing concrete using carbon fiber reinforced polymers, may share information with an individual who is an information recipient in the procedure, such as a bridge repair worker, who actually performs the method. Alternatively, the information recipient who performs the procedure can be a different information recipient from the information recipient with whom the information sharer shares information about the procedure. For example, a structural engineer who is an information sharer in reinforcing concrete using carbon fiber reinforced polymers, may share information with an individual who is an information recipient in the procedure, such as a construction manager who supervises one or more bridge repair workers, who actually performs the method. In these examples, the information recipient with whom the information sharer shares information can subsequently share the information with additional information recipients, such as the bridge repair workers in the example above, with or without the use of augmented reality.

In some example methods, an information sharer shares information about a procedure with an information recipient before the procedure is performed. For example, a medical practitioner may share information with an individual who is an information recipient in the procedure, such as a patient of the medical practitioner, before performing the procedure on the patient or another individual. Alternatively, an information sharer can share information about a procedure with an information recipient after the procedure has been performed. For example, a medical practitioner may share information with an individual who is an information recipient in the procedure, such as a patient of the medical practitioner, after performing the procedure on the patient or another individual. Also alternatively, an information sharer can share information about a procedure with an information recipient before and after the procedure has been performed. For example, a medical practitioner may share information with an individual who is an information recipient in the procedure, such as a patient of the medical practitioner, before performing the procedure on the patient or another individual and after performing the procedure on the patient or another individual. In these examples, a medical practitioner can share information with a patient before performing the procedure, such as pre-operative educational information, diagnostic information, or both, and can also share information with the patient after performing the procedure, such as post-operative educational information, diagnostic information, or patient-specific progress information.

In some example methods, an information sharer shares information about a procedure with an information recipient while the procedure is performed, either by the information sharer or another information sharer. For example, a medical practitioner may share information with an individual who is an information recipient in the procedure, such as a patient of the medical practitioner, while performing the procedure on the patient or another individual. These methods are particularly well-suited for educating information recipients on the procedure. For example, a medical practitioner may share information with multiple information recipients in the procedure, such as students, while performing the procedure on a patient. In another example, one medical practitioner information sharer in a procedure shares information with multiple information recipients in the procedure, such as students, while another medical practitioner information sharer performs the procedure on a patient. In one particular example, a medical practitioner information sharer in a procedure live streams educational information, patient specific information, or both to multiple information recipients in the procedure, such as students, family members of the patient, or a general audience, while the medical practitioner information sharer performs the procedure on a patient. In another particular example, a medical practitioner information sharer in a procedure live streams educational information, patient specific information, or both to multiple information recipients in the procedure, such as students, family members of the patient, or a general audience, while another medical practitioner information sharer performs the procedure on the patient.

The information sharer and information recipient can be present in the same physical location while the information sharer shares information about the procedure with the information recipient. For example, a medical practitioner information sharer may share information with an information recipient patient and an associate of the information recipient patient, such as a family member, in an office prior to performing the procedure on the patient. Alternatively, the information sharer and information recipient can be in different physical locations while the information sharer shares information about the procedure with the information recipient. For example, a medical practitioner information sharer may share information from the medical practitioner's office with an information recipient patient who is present structure physically distinct from the medical practitioner's office, such as a different room in the same building or even the patient's home. Each of the information sharer and the information recipient need only have access to the appropriate mixed reality or augmented reality system while present in their respective location.

Figure 13:
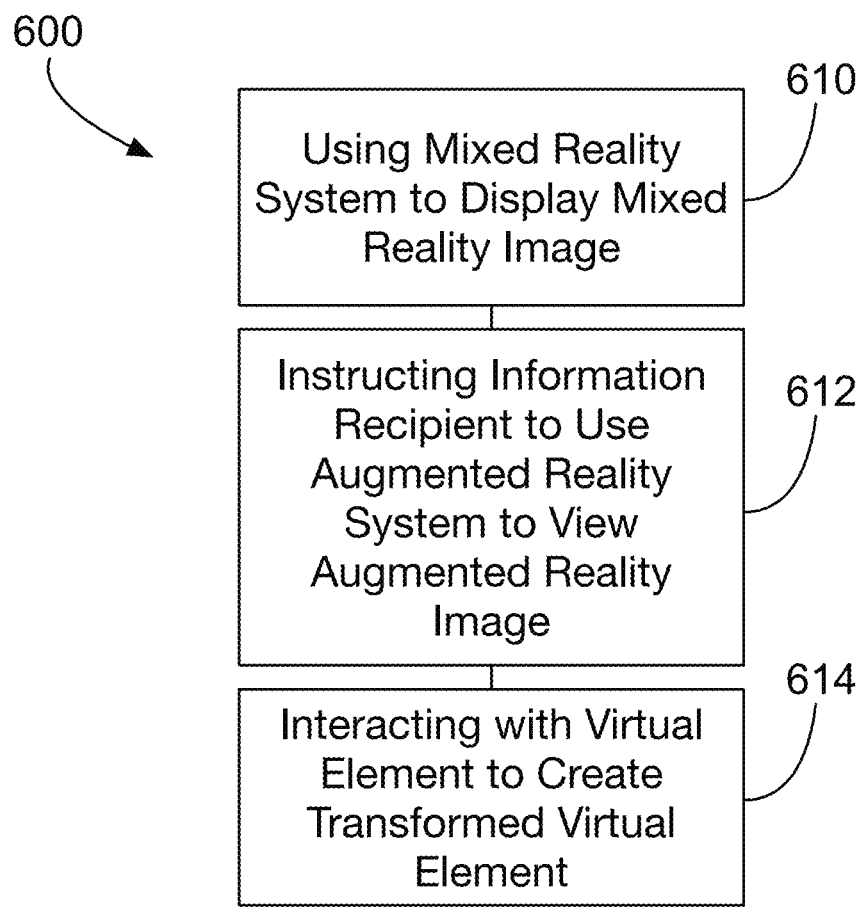
FIG. 13 is a flowchart representation of an example method for sharing information about a procedure.

FIG. 13 is a flowchart representation of an example method 600 for sharing information about a procedure. A first step 610 comprises using a mixed reality system to display a mixed reality image comprising a live view of a first real world environment and a virtual element not present in the first real world environment, the virtual element comprising a representation of information related to the procedure. Another step 612 comprises instructing an information recipient to use an augmented reality system in data communication with the mixed reality system to view an augmented reality image comprising a live view of a second real world environment and the virtual element. A third step 614 comprises interacting with the virtual element to create a transformed virtual element and cause the mixed reality system to replace the virtual element in the mixed reality image and the augmented reality image with the transformed virtual element.

Figure 14:
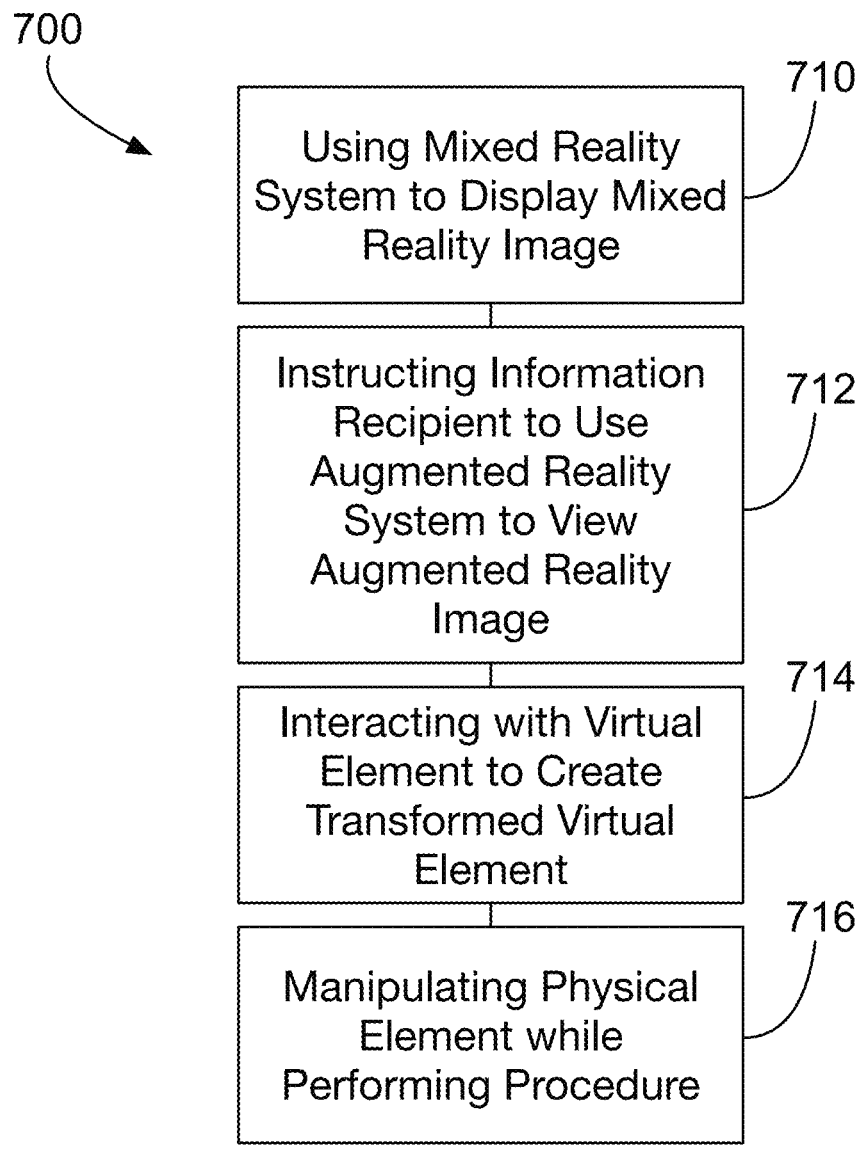
FIG. 14 is a flowchart representation of an example method for sharing information about a procedure and performing the procedure.

FIG. 14 is a flowchart representation of an example method 700 for sharing information about a procedure and performing the procedure. A first step 710 comprises using a mixed reality system to display a mixed reality image comprising a live view of a first real world environment and a virtual element not present in the first real world environment, the virtual element comprising a representation of information related to the procedure. Another step 712 comprises instructing an information recipient to use an augmented reality system in data communication with the mixed reality system to view an augmented reality image comprising a live view of a second real world environment and the virtual element. Another step 714 comprises interacting with the virtual element to create a transformed virtual element and cause the mixed reality system to replace the virtual element in the mixed reality image and the augmented reality image with the transformed virtual element. Another step 716 comprises manipulating a physical element in a third real world environment while performing the procedure, such as a tool useful in the performance of the procedure. The step 716 of manipulating a physical element is advantageously performed using a mixed reality system having a mixed reality viewing device that allows viewing of the physical element and displays a second virtual element that is a virtual representation of the physical element. The step 716 is can be performed before or after the step 712 of instructing an information recipient to use an augmented reality system. Also, the step 716 can be performed in the same physical location as the step 712. Advantageously, though, the step 712 of instructing an information recipient to use an augmented reality system is performed in a first location and the step 716 of manipulating a physical element is advantageously performed in a second, different location.

Figure 15:
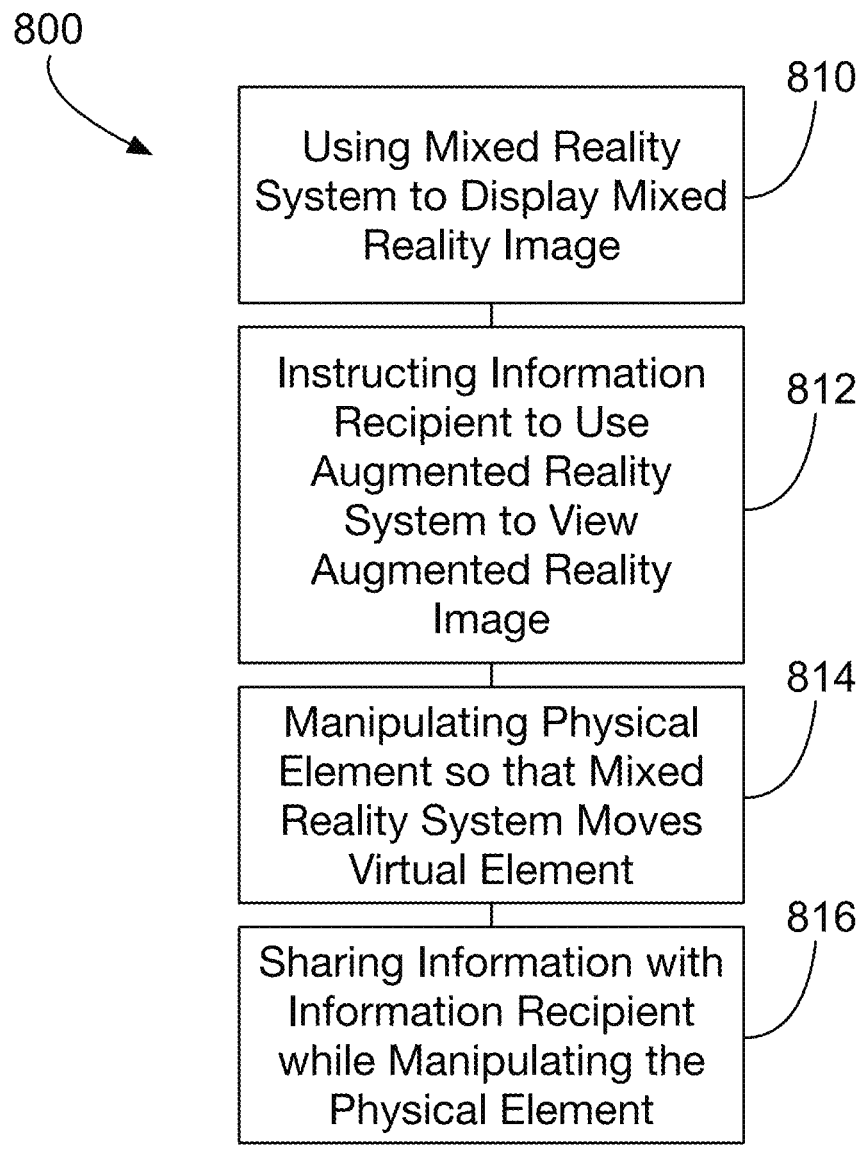
FIG. 15 is a flowchart representation of an example method for performing the procedure.

FIG. 15 is a flowchart representation of an example method 800 for performing a procedure. A first step 810 comprises using a mixed reality system to display a mixed reality image comprising a live view of a first real world environment and a virtual element comprising a representation of a physical item present in the first real world environment. Another step 812 comprises instructing an information recipient to use an augmented reality system in data communication with the mixed reality system to view an augmented reality image comprising a live view of a second real world environment and the virtual element. Another step 814 comprises manipulating the physical item such that the mixed reality system moves the virtual element in the virtual reality image and the mixed reality image. Another step 816 comprises sharing information with the information recipient while performing the step 814 of manipulating the physical item.

A specific example method relevant to medical procedures comprises obtaining an image of a bone or bones of a patient, such as a vertebral body, a regional portion of a spine, or the entire spine of a patient. Another step comprises providing spatial coordinates, such as a point cloud, representing the imaged bone or bones of the patient to a mixed reality system according to an embodiment described herein. Another step comprises generating a virtual element representing the image of the bone or bones based on the spatial coordinates. Another step comprises displaying the virtual element on a display screen of a mixed reality viewing device of the mixed reality system.

Another specific example method relevant to medical procedures comprises obtaining an image of a bone or bones of a patient, such as a vertebral body, a regional portion of a spine, or the entire spine of a patient. Another step comprises providing spatial coordinates, such as a point cloud, representing the imaged bone or bones of the patient to a mixed reality system according to an embodiment described herein. Another step comprises generating a virtual element representing the image of the bone or bones. Another step comprises displaying the virtual element on a display screen of a mixed reality viewing device of the mixed reality system. Another step comprises displaying the virtual element on an external display screen separate from the display screen of the mixed reality viewing device, such as a monitor.

Another specific example method relevant to medical procedures comprises obtaining an image of a bone or bones of a patient, such as a vertebral body, a regional portion of a spine, or the entire spine of a patient. Another step comprises providing spatial coordinates, such as a point cloud, representing the imaged bone or bones of the patient to a mixed reality system according to an embodiment described herein. Another step comprises generating a virtual element representing the image of the bone or bones. Another step comprises displaying the virtual element on a mixed reality viewing device of the mixed reality system. Another step comprises displaying the virtual element on an external display screen separate from the display screen of the mixed reality viewing device, such as a monitor. In this example, the displaying the virtual element on a display screen of the mixed reality viewing device occurs in a room that is different from the room in which the displaying the virtual element on an external display screen separate from the display screen of the mixed reality viewing device, such as a monitor, occurs.

Another specific example method relevant to medical procedures comprises obtaining an image of a bone or bones of a patient, such as a vertebral body, a regional portion of a spine, or the entire spine of a patient. Another step comprises providing spatial coordinates, such as a point cloud, representing the imaged bone or bones of the patient to a mixed reality viewing device according to an embodiment described herein. Another step comprises generating a virtual element representing the image of the bone or bones. Another step comprises displaying the virtual element on a display screen of the mixed reality viewing device. Another step comprises displaying the virtual element on an external display screen separate from the display screen of the mixed reality viewing device, such as a monitor. In this example, the displaying the virtual element on a display screen of the mixed reality viewing device occurs after the displaying the virtual element on an external display screen separate from the display screen of the mixed reality viewing device, such as a monitor, is completed. Also, in this example, the displaying the virtual element on a display screen of the mixed reality viewing device occurs in a room that is different from the room in which the displaying the virtual element on an external display screen separate from the display screen of the mixed reality viewing device, such as a monitor, occurs. Also, in this embodiment, the displaying the virtual element on an external display screen separate from the display screen of the mixed reality viewing device, such as a monitor, is performed such that the patient can view the virtual element prior to having the procedure conducted.

Another specific example method relevant to medical procedures comprises obtaining an image of a bone or bones of a patient, such as a vertebral body, a regional portion of a spine, or the entire spine of a patient. Another step comprises providing spatial coordinates, such as a point cloud, representing the imaged bone or bones of the patient to a mixed reality viewing device according to an embodiment described herein. Another step comprises generating a virtual element representing the image of the bone or bones. Another step comprises displaying the virtual element on a display screen of the mixed reality viewing device. Another step comprises displaying the virtual element on a display screen of a second mixed reality viewing device, a display screen of an augmented reality viewing device of an augmented reality system, or both. The displaying the virtual element on the display screen of the mixed reality viewing device and the displaying the virtual element on a display screen of a second mixed reality viewing device, a display screen of an augmented reality viewing device of an augmented reality system, or both can occur concurrently in different rooms, concurrently in the same room, prior to a medical procedure on the bone represented by the virtual element, and/or concurrently with a medical procedure on the bone represented by the virtual element.

Those with ordinary skill in the art will appreciate that various modifications and alternatives for the described and illustrated examples can be developed in light of the overall teachings of the disclosure, and that the various elements and features of one example described and illustrated herein can be combined with various elements and features of another example without departing from the scope of the invention. Accordingly, the particular examples disclosed herein have been selected by the inventors simply to describe and illustrate examples of the invention and are not intended to limit the scope of the invention or its protection, which is to be given the full breadth of the appended claims and any and all equivalents thereof.

We claim:

1. A method for sharing information about a procedure, comprising:
    using a mixed reality system to display a mixed reality image comprising a live view of a first real world environment and a virtual element not present in the first real world environment, the virtual element comprising a representation of information related to said procedure;
    instructing an information recipient comprising an individual human being to use an augmented reality system in data communication with the mixed reality system to view an augmented reality image comprising a live view of a second real world environment and the virtual element; and
    interacting with the virtual element to create a transformed virtual element and cause the mixed reality system to replace the virtual element in the mixed reality image and the augmented reality image with the transformed virtual element.

2. The method of claim 1, wherein the virtual element comprises a digital representation of a bone of the information recipient.

3. The method of claim 2, wherein the bone comprises a vertebral body of the information recipient.

4. The method of claim 2, wherein the bone comprises a regional portion of a spine of the information recipient.

5. The method of claim 2, wherein the bone comprises the entire spine of the information recipient.

6. The method of claim 1, further comprising instructing a second information recipient to use a second augmented reality system in data communication with the mixed reality system to view a third augmented reality image comprising a live view of a third real world environment and the virtual element.

7. The method of claim 1, further comprising instructing a second information recipient to use a display screen in data communication with the mixed reality system to view a third augmented reality image comprising a live view of a third real world environment and the virtual element.

8. The method of claim 1, further comprising instructing a second information recipient to use a display screen in data communication with the mixed reality system to view the virtual element.

9. The method of claim 1, wherein the first real world environment and the second real world environment are in the same room.

10. The method of claim 1, wherein the first real world environment is in a first room and the second real world environment is in a second room that is different from the first room.

11. A method for sharing information about a procedure and performing the procedure, comprising:
    using a mixed reality system to display a mixed reality image comprising a live view of a first real world environment and a virtual element not present in the first real world environment, the virtual element comprising a representation of information related to said procedure;
    instructing an information recipient comprising an individual human being to use an augmented reality system in data communication with the mixed reality system to view an augmented reality image comprising a live view of a second real world environment and the virtual element;
    interacting with the virtual element to create a transformed virtual element and cause the mixed reality system to replace the virtual element in the mixed reality image and the augmented reality image with the transformed virtual element; and
    manipulating a physical element in a third real world environment while performing said procedure.

12. The method of claim 11, wherein the virtual element comprises a digital representation of a bone of the information recipient.

13. The method of claim 12, wherein the bone comprises a vertebral body of the information recipient.

14. The method of claim 12, wherein the bone comprises a regional portion of a spine of the information recipient.

15. The method of claim 12, wherein the bone comprises the entire spine of the information recipient.

16. The method of claim 11, wherein the first real world environment and the second real world environment are in a first room.

17. The method of claim 16, wherein the third real world environment is in a second room that is different from the first room.

18. The method of claim 11, wherein the using, instructing, and interacting are performed concurrently with the manipulating a physical element.

19. The method of claim 11, wherein the using, instructing, and interacting are completed prior to initiation of the manipulating a physical element.

20. A method for sharing information about a procedure and performing the procedure, comprising:
    using a first mixed reality system to display a first mixed reality image comprising a live view of a first real world environment in a first room and a virtual element not present in the first real world environment, the virtual element comprising a representation of information related to said procedure;
    instructing an information recipient comprising an individual human being to use an augmented reality system in data communication with the mixed reality system to view an augmented reality image comprising a live view of a second real world environment in the first room and the virtual element;
    interacting with the virtual element to create a transformed virtual element and cause the mixed reality system to replace the virtual element in the mixed reality image and the augmented reality image with the transformed virtual element;
    using a second mixed reality system to display a second mixed reality image comprising a live view of a third real world environment in a second room and the virtual element, the second room different from the first room; and manipulating a physical element in the third real world environment while performing said procedure;

wherein the virtual element comprises a digital representation of a bone of the information recipient.

* * * * *